US012748448B2

(12) United States Patent
Lee et al.

(10) Patent No.: US 12,748,448 B2
(45) Date of Patent: Sep. 29, 2026

(54) ELECTRONIC DEVICES WITH POWER MANAGEMENT

(71) Applicant: SAMSUNG ELECTRONICS CO., LTD., Suwon-si (KR)

(72) Inventors: Ik Su Lee, Suwon-si (KR); Jung Hun Heo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 145 days.

(21) Appl. No.: 18/921,665

(22) Filed: Oct. 21, 2024

(65) Prior Publication Data

US 2025/0216880 A1 Jul. 3, 2025

(30) Foreign Application Priority Data

Dec. 29, 2023 (KR) ........................ 10-2023-0197727

(51) Int. Cl.

| | |
|---|---|
| ***G05F 1/577*** | (2006.01) |
| ***G05F 1/563*** | (2006.01) |
| ***G05F 1/565*** | (2006.01) |
| ***G05F 1/575*** | (2006.01) |
| ***H02J 1/082*** | (2026.01) |
| ***H02M 1/00*** | (2007.01) |
| *H02J 105/44* | (2026.01) |

(52) U.S. Cl.

CPC .............. *G05F 1/577* (2013.01); *G05F 1/563* (2013.01); *G05F 1/565* (2013.01); *G05F 1/575* (2013.01); *H02M 1/0045* (2021.05); *H02J 1/082* (2020.01); *H02J 2105/44* (2026.01); *H02M 1/007* (2021.05); *H02M 1/008* (2021.05)

(58) Field of Classification Search

CPC .... G05F 1/465; G05F 1/56–575; G05F 1/577; H02J 1/082; H02J 2105/44; H02M 1/0045; H02M 1/007; H02M 1/008

See application file for complete search history.

(56) References Cited

U.S. PATENT DOCUMENTS

| | | | |
|---|---|---|---|
| 7,020,786 | B2 | 3/2006 | Vyssotski et al. |
| 8,471,543 | B2 | 6/2013 | Nakazono |
| 9,317,048 | B2 | 4/2016 | Kuang et al. |

(Continued)

FOREIGN PATENT DOCUMENTS

| | | | | |
|---|---|---|---|---|
| WO | WO-2022146506 A1 * | 7/2022 | ............ | H02M 1/007 |

*Primary Examiner* — Fred E Finch, III

(74) *Attorney, Agent, or Firm* — Fish & Richardson P.C.

(57) ABSTRACT

An electronic device includes a first power management device configured to receive an input voltage, and output first voltages based on the input voltage, and at least one consumer which is configured to receive the first voltages from the first power management device, and operate based on the first voltages. The first power management device includes a switching regulator configured to generate a converted voltage from the input voltage, a first LDO regulator which is configured to generate a first output voltage from a first drop voltage generated by the converted voltage passed through a first PDN, a second LDO regulator and PDN, and a switching regulator which is configured to estimate a first dropout voltage of the first LDO regulator, calculate a voltage drop caused by the first PDN, and dynamically control the converted voltage based on estimated dropout voltages and calculated voltage drops caused by the PDNs.

20 Claims, 19 Drawing Sheets

(56) References Cited

U.S. PATENT DOCUMENTS

| | | | | |
|---|---|---|---|---|
| 9,837,897 | B2 | 12/2017 | Harshey et al. | |
| 11,061,423 | B2 | 7/2021 | Lee et al. | |
| 11,658,574 | B2 | 5/2023 | Rai et al. | |
| 11,682,967 | B1 | 6/2023 | Bogue et al. | |
| 2018/0013303 | A1* | 1/2018 | Wu | H02J 7/02 |
| 2018/0032095 | A1* | 2/2018 | Lee | G05F 1/575 |
| 2018/0136680 | A1* | 5/2018 | Du | G05F 1/575 |
| 2022/0094256 | A1* | 3/2022 | Radhakrishnan | H02M 3/07 |
| 2024/0411333 | A1* | 12/2024 | Nam | G05F 1/571 |
| 2025/0390125 | A1* | 12/2025 | Ryu | G05F 1/462 |

* cited by examiner

FIG. 14

| LDOs | Scenario1 | Scenario2 | Scenario3 | Scenario4 | Scenario5 |
|---|---|---|---|---|---|
| LDO Regulator1 | 50mV | 50mV | 100mV | 30mV | 30mV |
| LDO Regulator2 | 50mV | 40mV | 90mV | 30mV | 30mV |

ELECTRONIC DEVICES WITH POWER MANAGEMENT

CROSS-REFERENCE TO RELATED APPLICATION

This application claims priority under 35 U.S.C. 119 from Korean Patent Application No. 10-2023-0197727, filed on Dec. 29, 2023 in the Korean Intellectual Property Office, and all the benefits accruing therefrom under 35 U.S.C. 119, the contents of that application being incorporated by reference herein in their entirety.

BACKGROUND

Electronic circuits and electronic devices can include a power management device that converts an input voltage received from the outside to provide a power supply voltage. In a typical portable electronic device, the power management device receives an input voltage from a battery, and provides various power supply voltages suitable for internal operation from the input voltage. Various regulators that adjust the magnitude of the input voltage received from the outside may be included inside the power management device or inside the electronic device.

SUMMARY

Aspects of the present disclosure provide electronic devices including power management devices having improved power efficiency, and corresponding methods. The above and other aspects of the present disclosure will become more apparent to one of ordinary skill in the art to which the present disclosure pertains by referencing the detailed description of the present disclosure given below.

According to some implementations of the present disclosure, there is provided an electronic device comprising a first power management device which is configured to receive an input voltage, and output a plurality of first voltages based on the input voltage, and at least one consumer which is configured to receive the plurality of first voltages from the first power management device, and operate based on the plurality of first voltages, wherein the first power management device includes a switching regulator which is configured to generate a converted voltage from the input voltage, a first LDO (Low Drop-Out) regulator which is configured to generate a first output voltage from a first drop voltage generated by the converted voltage passed through a first PDN (Power Distribution Network), a second LDO regulator which is configured to generate a second output voltage from a second drop voltage generated by the converted voltage passed through a second PDN, and a switching regulator which is configured to estimate a first dropout voltage of the first LDO regulator based on a first output current of the first LDO regulator, estimate a second dropout voltage of the second LDO regulator based on a second output current of the second LDO regulator, calculate a voltage drop caused by the first PDN based on a first input current and a first input voltage of the first LDO regulator, calculate a voltage drop caused by the second PDN based on a second input current and a second input voltage of the second LDO regulator, and dynamically control the converted voltage based on the estimated first and second dropout voltages and the calculated voltage drops caused by the first and second PDNs.

According to some implementations of the present disclosure, there is provided an electronic device comprising a first power management device which is configured to receive an input voltage, and output a plurality of first voltages suitable for driving a system-on-chip from the input voltage, and a power management device controller which is configured to control the operation of the first power management device, generate a command about an operating scenario of the system-on-chip and transmit the command to the first power management device, wherein the first power management device includes a switching regulator which is configured to generate a converted voltage from the input voltage, a plurality of LDO (Low Drop-Out) regulators which are each configured to generate a plurality of output voltages from the converted voltage, first registers which are configured to store a plurality of output voltages generated by each of the plurality of the LDO regulators, a first dropout voltage register which is configured to store a plurality of dropout voltages corresponding to each of the plurality of the LDO regulators according to the operating scenario of the system-on-chip, and a switching regulator controller which is configured to receive the plurality of output voltages from the first registers, receive dropout voltages corresponding to the operating scenario of the system-on-chip among the plurality of dropout voltages from the first dropout voltage register, and dynamically control the converted voltage based on the plurality of received output voltages and the dropout voltages, in response to reception of the command from the power management device controller.

According to some implementations of the present disclosure, there is provided an operating method of a power management device which includes a switching regulator configured to generate a converted voltage from an input voltage, and a switching regulator controller configured to dynamically control the converted voltage, the operating method comprising receiving a plurality of dropout voltages corresponding to each of a plurality of LDO (Low Drop-Out) regulators according to an operating scenario of a system-on-chip from the power management device controller, storing the plurality of dropout voltages in the dropout voltage register, receiving a command about the operating scenario of the system-on-chip from the power management device controller, storing a plurality of output voltages generated by each of the plurality of the LDO regulators in the first registers, receiving dropout voltages corresponding to the operating scenario of the system-on-chip among the plurality of dropout voltages stored in the dropout voltage register, and receiving the plurality of output voltages from the first resisters, by the switching regulator, in response to reception of the command, generating a voltage control signal for controlling the switching regulator based on the received dropout voltages and the output voltages, by the switching regulator controller, and providing the generated voltage control signal to the switching regulator.

Aspects of the present disclosure are not limited to those described above, and other aspects of the present disclosure will be apparent from the following description.

BRIEF DESCRIPTION OF THE DRAWINGS

The above and other aspects and features of the present disclosure will become more apparent by describing in detail examples thereof with reference to the attached drawings, in which:

FIG. 14 is diagram illustrating dropout voltages stored in the dropout voltage register of FIG. 13.

DETAILED DESCRIPTION

Figure 1:
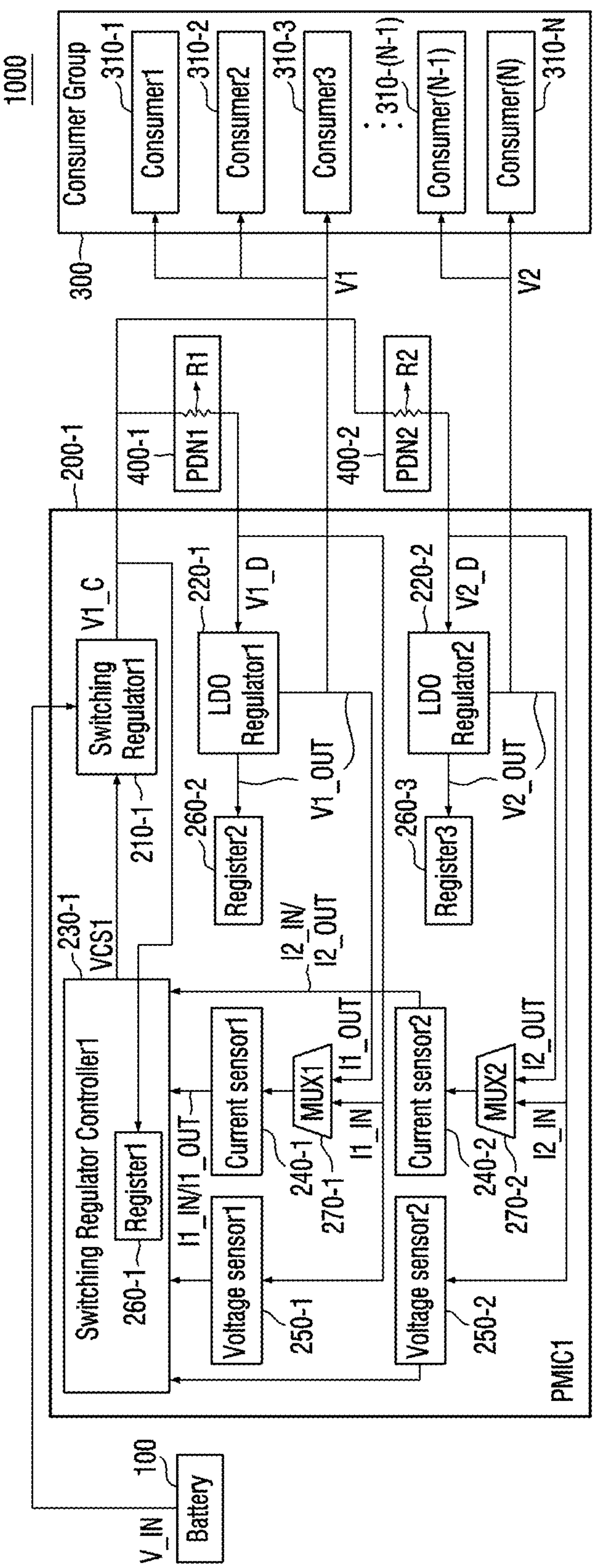
FIG. 1 is a diagram illustrating an electronic device including a power management device according to some implementations.

FIG. 1 is a diagram illustrating an electronic device including a power management device according to some implementations. Referring to FIG. 1, an electronic device 1000 may include a battery 100, a power management device 200-1, and a consumer group 300. However, the components are not limited thereto, and the electronic device 1000 may further include other components in addition to the shown components.

The battery 100 may generate an input voltage V_IN and provide it to the power management device 200-1. The battery 100 may be charged by receiving power from an external voltage source of the electronic device 1000. In some implementations, the battery 100 may generate an input voltage V_IN of approximately 4V in a fully charged state.

The consumer group 300 may include a plurality of consumers 310-1 to 310-N (where N is an integer of 2 or more). The consumers 310-1 to 310-N are components that operate during operation of the electronic device 1000, among the components included in the electronic device 1000. For example, the consumers 310-1 to 310-N may include various chips or modules included in the electronic device 1000, for example, a modem, an application processor, a memory, a display, and/or a radio frequency (RF) chip. Furthermore, the consumers 310-1 to 310-N may be an operating block, a functional block or an IP (Intellectual Property) block included in the electronic device 1000, a functional block or memory controller in a system-on-chip (SoC), a multimedia block or a memory controller in an application processor, and/or the like.

The consumers 310-1 to 310-N can be referred to as "consumers" because they consume power. The consumers 310-1 to 310-N may be referred to as consumer blocks or loads. That is, each of the consumers 310-1 to 310-N may be provided with voltage from the battery 100 via the power management device 200-1, and may operate based on the provided voltage.

The power management device 200-1 may receive an input voltage V_IN from the battery 100, distribute the received input voltage V_IN as appropriate, and may output a plurality of voltages V1 and V2 suitable for driving each of the plurality of consumers 310-1 to 310-N. Each of the plurality of consumers 310-1 to 310-N may receive at least one of the plurality of voltages V1 and V2 that are output from the power management device 200-1, and may operate based on the received voltage. For example, the consumers corresponding to some of the consumers 310-1 to 310-N belonging to the consumer group 300 may each be distributed with the voltage V1 from the power management device 200-1, and the consumers corresponding to some of the other consumers may each be distributed with the voltage V2 from the power management device 200-1. In some implementations, the power management device 200-1 may be a PMIC (Power Management Integrated Circuit).

As will be described below, the voltage V1 provided to the consumer group 300 by the power management device 200-1 may be an output voltage V1_OUT which is output by the LDO regulator 220-1 included in the power management device 200-1. Further, the voltage V2 provided to the consumer group 300 by the power management device 200-1 may be an output voltage V2_OUT which is output by the LDO regulator 220-2 included in the power management device 200-1.

The power management device 200-1 may include a switching regulator 210-1, LDO (Low Drop-Out) regulators 220-1 and 220-2, a switching regulator controller 230-1, current sensors 240-1 and 240-2, voltage sensors 250-1 and 250-2, registers 260-1, 260-2 and 260-3, and multiplexers 270-1 and 270-2.

Although FIG. 1 shows that the power management device 200-1 includes one switching regulator, according to some implementations, the power management device 200-1 may include two or more switching regulators. Furthermore, although FIG. 1 shows that two LDO regulators 220-1 and 220-2 are connected to one switching regulator 210-1 of the power management device 200-1 in a multi-stage structure, implementations are not limited thereto. For example, the number of the LDO regulators that are connected to one switching regulator 210-1 in a multi-stage structure to receive a converted voltage V1_C from the switching regulator 210-1 may vary. For example, the power management device 200-1 may include a structure in which at least two or more LDO regulators are connected to at least one switching regulator in multi-stages. Hereinafter, the description will be made assuming that the power management device 200-1 includes one switching regulator 210-1, and two LDO regulators 220-1 and 220-2 connected to the switching regulator 210-1 in a group.

The switching regulator 210-1 may generate a converted voltage V1_C from the input voltage V_IN received from the battery 100. The switching regulator 210-1 may use energy storage components (e.g., an inductor and a capacitor) and an output stage to generate the converted voltage V1_C. For example, the switching regulator 210-1 may be a DC-DC converter. The switching regulator 210-1 may be a step-up converter (e.g., a boost converter) that converts the low input voltage V_IN into the high converted voltage V1_C or a step-down converter (e.g., a buck converter) that converts the high input voltage V_IN into the low converted voltage V1_C.

The switching regulator 210-1 may dynamically change the converted voltage V1_C in response to the voltage control signal VCS1. For example, the converted voltage V1_C may be dynamically changed depending on the output currents I1_OUT and I2_OUT of the LDO regulators 220-1 and 220-2, the output voltages V1_OUT and V2_OUT of the LDO regulators 220-1 and 220-2, operating states of the LDO regulators 220-1 and 220-2 and/or the degree of voltage drop caused by each of the PDNs (Power Distribution Networks) 400-1 and 400-2.

The LDO regulators 220-1 and 220-2 may be commonly connected to the switching regulator 210-1. The switching regulator 210-1 and the LDO regulators 220-1 and 220-2 may be connected in a multi-stage structure. The LDO regulators 220-1 and 220-2 may be linear regulators.

The LDO regulators 220-1 and 220-2 may receive voltage from the switching regulator 210-1 and generate output voltages V1_OUT and V2_OUT, respectively. The converted voltage V1_C that is output from the switching regulator 210-1 may be input to the LDO regulator 220-1 via a PDN (Power Distribution Network) 400-1. For example, the converted voltage V1_C that is output from the switching regulator 210-1 may pass through a PDN 400-1 and then may be input to the LDO regulator 220-1 as V1_D. Similarly, the converted voltage V1_C that is output from the switching regulator 210-1 may be input to the LDO regulator 220-2 via the PDN 400-2. In other words, the converted voltage V1_C that is output from the switching regulator 210-1 may pass through a PDN 400-2 and then may be input to the LDO regulator 220-2 as V2_D. The PDNs 400-1 and 400-2 may include electrical paths that connect the switching regulator 210-1 and the LDO regulators 220-1 and 220-2. For example, if the consumer which receives the voltage V1 or voltage V2 from the power management device 200-1 is a system-on-chip, the PDNs 400-1 and 400-2 may be electrical paths (e.g., traces, vias, etc.) of the printed circuit board (PCB) equipped with the system-on-chip.

When the converted voltage V1_C that is output from the switching regulator 210-1 passes through the PDN 400-1, the voltage may drop due to the resistor R1 of the PDN 400-1. Accordingly, the converted voltage V1_C output from the switching regulator 210-1 may be converted into the drop voltage V1_D while going through the PDN 400-1. Therefore, the voltage which is input to the LDO regulator 220-1 via (or passing through) the PDN 400-1 may be the drop voltage V1_D. That is, the drop voltage V1_D may be the input voltage of the LDO regulator 220-1. The magnitude of the drop voltage V1_D may be smaller than the magnitude of the converted voltage V1_C.

Similarly, when the converted voltage V1_C output from the switching regulator 210-1 passes through the PDN 400-2, the voltage may drop due to the resistor R2 of the PDN 400-2. Accordingly, the converted voltage V1_C output from the switching regulator 210-1 may be converted into the drop voltage V2_D, while going through the PDN 400-2. Therefore, the voltage that is input to the LDO regulator 220-2 via (or passing through) the PDN 400-2 may be the drop voltage V2_D. That is, the drop voltage V2_D may be the input voltage of the LDO regulator 220-2. The magnitude of the drop voltage V2_D may be smaller than the magnitude of the converted voltage V1_C.

In this way, even if the switching regulator 210-1 and the LDO regulators 220-1 and 220-2 are disposed in the same power management device 200-1, the routing between the configurations in the electronic device 1000 becomes complicated. Therefore, when the converted voltage V1_C that is output from the switching regulator 210-1 is input to the LDO regulator 220-1 or the LDO regulator 220-2 via (or passed through) the PDN 400-1 or PDN 400-2, the degree of voltage drop caused by the resistor R1 of the PDN 400-1 or the resistor R2 of the PDN 400-2 may be significant to a non-negligible degree.

Furthermore, as shown in FIG. 1, the electrical path through which the converted voltage V1_C output from the switching regulator 210-1 is input to the LDO regulator 220-2 via (or passed through) the PDN 400-2 is longer than the electrical path input to the LDO regulator 220-1 via (or passed through) the PDN 400-1, such that the effect of the voltage drop caused by the resistor R2 of the PDN 400-2 may be greater than the effect of the voltage drop caused by the resistor R1 of the PDN 400-1. Therefore, the magnitude of the drop voltage V2_D may be smaller than the magnitude of the drop voltage V1_D.

Each of the LDO regulators 220-1 and 220-2 may generate each of an output voltage V1_OUT and an output voltage V2_OUT, based on the received drop voltage V1_D and drop voltage V2_D. The output voltage V1_OUT may be lower than the drop voltage V1_D, and the output voltage V2_OUT may be lower than the drop voltage V2_D. Further, the output voltage V1_OUT and the output voltage V2_OUT may be different from each other.

In this way, in each of the LDO regulators 220-1 and 220-2, a magnitude of the output voltage may be smaller than magnitude of the input voltage due to effects of its own voltage drop. The voltage drop that occurs in the LDO regulator in this way is called a dropout voltage V_DROPOUT. The dropout voltage V_DROPOUT may correspond to a minimum difference between the input and output voltages of the LDO regulator. For example, the LDO regulator may operate normally, only when the input voltage of the LDO regulator is equal to or greater than the sum of the output voltage and the dropout voltage V_DROPOUT. The dropout voltage V_DROPOUT of the LDO regulator will be described below with reference to FIG. 2 or the like.

The converted voltage V1_C that is output from the switching regulator 210-1 may be stored in the register 260-1. Further, the output voltage V1_OUT generated by the LDO regulator 220-1 may be stored in the register 260-2, and the output voltage V2_OUT generated by the LDO regulator 220-2 may be stored in the register 260-3. Although the register 260-1 is shown as being included in the switching regulator controller 230-1 in FIG. 1, its arrangement is not limited thereto.

While the efficiency of the switching regulator 210-1 may be substantially constant regardless of the input/output voltage, the efficiency of each of the LDO regulators 220-1 and 220-2 may be variable depending on the input/output voltage. For example, the efficiency may correspond to a ratio of each of the output voltages V1_OUT and V2_OUT to each of the drop voltages V1_D and V2_D. For example, the efficiency of the LDO regulator 220-1 may be a ratio (i.e., V1_OUT/V1_D) of the output voltage V1_OUT to the drop voltage V1_D, and the efficiency of the LDO regulator 220-2 may be a ratio (i.e., V2_OUT/V2_D) of the output voltage V2_OUT to the drop voltage V2_D. Therefore, in order to improve the efficiency of the LDO regulators 220-1 and 220-2, it may be desirable to reduce the difference between the input and output voltages of the LDO regulators 220-1 and 220-2.

If the difference between the input and output voltages of the LDO regulators 220-1 and 220-2 is large, when the switching regulator 210-1 is disposed at a front end of the LDO regulators 220-1 and 220-2, and the output of the switching regulator 210-1 is used as an input to the LDO regulators 220-1 and 220-2, the overall conversion efficiency of the power management device 200-1 may be improved. Therefore, when the output voltages V1_OUT and V2_OUT of the LDO regulators 220-1 and 220-2 are different from each other, switching regulators may be disposed in a one-to-one arrangement at the front end of the LDO regulators 220-1 and 220-2, such that the overall conversion efficiency of the power management device 200-1 may be improved or maximized.

However, in some cases, in order to reduce the manufacturing cost and increase the area efficiency of the power management device 200-1, the LDO regulators 220-1 and 220-2 may be grouped and switching regulator(s) may be shared and used for each group. In this case, the difference between the input and output voltages of the LDO regulators 220-1 and 220-2 may be larger than a case in which the LDO regulators 220-1 and 220-2 and the switching regulator are arranged in a one-to-one configuration. As a result, the overall conversion efficiency of the power management device 200-1 may drop.

However, according to some implementations of the present disclosure, the switching regulator 210-1 may dynamically change the converted voltage V1_C in response to the voltage control signal VCS1. Accordingly, the overall conversion efficiency of the power management device 200-1 may be improved. Operations in which the voltage control signal VCS1 and the switching regulator controller 230-1 dynamically change the converted voltage V1_C output by the switching regulator 210-1 will be described below.

The switching regulator controller 230-1 may generate a voltage control signal VCS1 for dynamically controlling the converted voltage V1_C output from the switching regulator 210-1, and may provide the generated voltage control signal VCS1 to the switching regulator 210-1. In some implementations, the switching regulator controller 230-1 may generate the voltage control signal VCS1, based on the currents I1_OUT and I2_OUT output from the LDO regulators 220-1 and 220-2, which can be the currents consumed by the consumers 310-1 to 310-N.

Furthermore, the switching regulator controller 230-1 may generate the voltage control signal VCS1 based on the operating states of the consumers 310-1 to 310-N. Further, the switching regulator controller 230-1 may generate the voltage control signal VCS1 based on the operating states of the LDO regulators 220-1 and 220-2. For example, if the consumer does not operate and the LDO regulator that supplies voltage to the consumer does not generate an output voltage based on the converted voltage V1_C received from the switching regulator 210-1, the switching regulator controller 230-1 may generate the voltage control signal VCS1 that controls the switching regulator 210-1 so that the LDO regulator is not used as a reference, when the switching regulator 210-1 generates the converted voltage V1-C.

Furthermore, the switching regulator controller 230-1 may generate the voltage control signal VCS1 based on the voltage drop caused by each of the PDNs 400-1 and 400-2. Furthermore, the switching regulator controller 230-1 may generate the voltage control signal VCS1 based on the output voltages V1_OUT and V2_OUT of the LDO regulators 220-1 and 220-2. For example, the switching regulator controller 230-1 may recognize each of the output voltage V1_OUT of the LDO regulator 220-1 and the output voltage V2_OUT of the LDO regulator 220-2 which are stored in each of the register 260-2 and register 260-3.

The voltage sensor 250-1 may sense the drop voltage V1_D which is input to the LDO regulator 220-1. The voltage sensor 250-1 may transmit the sensed value of drop voltage V1_D to the switching regulator controller 230-1.

A current sensor 240-1 may sense either an input current I1_IN of the LDO regulator 220-1 or an output current I1_OUT of the LDO regulator 220-1. For example, the input current I1_IN and the output current I1_OUT of the LDO regulator 220-1 may be input to the multiplexer 270-1, and the multiplexer 270-1 may select either the input current I1_IN or the output current I1_OUT of the LDO regulator 220-1, and transmit it to the current sensor 240-1. The current sensor 240-1 may sense the transmitted current among the input current I1_IN and the output current I1_OUT of the LDO regulator 220-1, and may transmit the value of the sensed current to the switching regulator controller 230-1.

The switching regulator controller 230-1 may calculate the voltage drop caused by the PDN 400-1, by the use of the drop voltage V1_D value which is input to the LDO regulator 220-1 received from the voltage sensor 250-1, and the input current I1_IN value of the LDO regulator 220-1 received from the current sensor 240-1. For example, a magnitude ΔV1 of the voltage which drops by the PDN 400-1 may correspond to a difference between the converted voltage V1_C output from the switching regulator 210-1 and the drop voltage V1_D input to the LDO regulator 220-1 (i.e., $\Delta V1=V\_C-V1\_D$).

Furthermore, the switching regulator controller 230-1 may calculate a resistor R1 value of the PDN 400-1, using the value of the drop voltage V1_D input to the LDO regulator 220-1, and the value of the input current I1_IN of the LDO regulator 220-1. Accordingly, the switching regulator controller 230-1 may calculate the voltage drop caused by the PDN 400-1, using the value of the resistor R1 of the PDN 400-1, and the value of the current flowing through the resistor R1 of the PDN 400-1.

A voltage sensor 250-2 may sense the value of drop voltage V2_D that is input to the LDO regulator 220-2. The voltage sensor 250-2 may transmit the sensed value of the drop voltage V2_D to the switching regulator controller 230-1.

A current sensor 240-2 may sense either an input current I2_IN of the LDO regulator 220-2 or an output current I2_OUT of the LDO regulator 220-2. For example, the input current I2_IN and the output current I2_OUT of the LDO regulator 220-2 may be input to the multiplexer 270-2, and the multiplexer 270-2 may select either the input current I2_IN or the output current I2_OUT of the LDO regulator 220-2, and transmit it to the current sensor 240-2. The current sensor 240-2 may sense the transmitted current among the input current I2_IN and the output current I2_OUT of the LDO regulator 220-2, and may transmit the value of the sensed current to the switching regulator controller 230-1.

The switching regulator controller 230-1 may calculate the voltage drop caused by the PDN 400-2, by the use of the drop voltage V2_D value that is input to the LDO regulator 220-2 received from the voltage sensor 250-2, and the input current I2_IN value of the LDO regulator 220-2 received from the current sensor 240-2. For example, a magnitude ΔV2 of the voltage which drops by the PDN 400-2 may correspond to a difference between the converted voltage V1_C output from the switching regulator 210-1 and the drop voltage V2_D input to the LDO regulator 220-2 (i.e., ΔV2=V_C−V2_D).

Furthermore, the switching regulator controller 230-1 may calculate the resistor R2 value of the PDN 400-2, using the value of the drop voltage V2_D that is input to the LDO regulator 220-2, and the value of the input current I2_IN of the LDO regulator 220-2. Therefore, the switching regulator controller 230-1 may calculate the voltage drop caused by the PDN 400-2, using the value of the resistor R2 of the PDN 400-2 and the value of the current flowing through the resistor R2 of the PDN 400-2.

The current sensor 240-1 may detect each of the consumption currents of the consumers 310-1 to 310-N that are supplied with the output voltage V1_OUT generated by the LDO regulator 220-1, based on the sensed value of the output current I1_OUT of the LDO regulator 220-1. Similarly, the current sensor 240-2 may detect each of the consumption currents of the consumers 310-1 to 310-N that are supplied with the output voltage V2_OUT generated by the LDO regulator 220-2, based on the sensed value of the output current I2_OUT of the LDO regulator 220-2. The current sensor 240-1 and the current sensor 240-2 may transmit information about the detected consumption currents to the switching regulator controller 230-1.

According to some implementations, the switching regulator controller 230-1 may dynamically control the converted voltage V1_C that is output from the switching regulator 210-1, based on the output currents of the LDO regulators 220-1 and 220-2, the output voltages of the LDO regulators 220-1 and 220-2, the operating states of the LDO regulators 220-1 and 220-2, and/or the voltage drops caused by the PDNs 400-1 and 400-2. As a result, even when the LDO regulators 220-1 and 220-2 that generate different output voltages V1_OUT and V2_OUT are commonly connected to one switching regulator 210-1, the converted voltage V1_C that is output from the switching regulator 210-1 may be controlled to the minimum voltage necessary for the operation of the LDO regulators 220-1 and 220-2.

For example, the switching regulator controller 230-1 may determine the value of the converted voltage V1_C generated by the switching regulator 210-1 based on Formula 1 below.

$$V1\_C = \mathrm{MAX}(V\_OUT + V\_DROPOUT + V\_PDN) \quad \text{[Formula 1]}$$

The switching regulator controller 230-1 may calculate the sum of the output voltage V_OUT of the LDO regulator, the dropout voltage V_DROPOUT of the LDO regulator, and the voltage drop caused by the PDN corresponding to the LDO regulator, for each LDO regulator connected to the switching regulator 210-1 in a multi-stage structure. Furthermore, the switching regulator controller 230-1 may generate a voltage control signal VCS1 for controlling the switching regulator 210-1 so that the value of the converted voltage V1_C generated by the switching regulator 210-1 is equal to the maximum value of the sum calculated for each LDO regulator, and may transmit the generated voltage control signal VCS1 to the switching regulator 210-1.

The dropout voltage V_DROPOUT of the LDO regulator may be estimated from the output current of the LDO regulator. An example of a method for estimating the dropout voltage V_DROPOUT of the LDO regulator from the output current of the LDO regulator will be described below with reference to FIG. 2.

For example, as shown in FIG. 1, when the LDO regulator 220-1 and the LDO regulator 220-2 are connected to the switching regulator 210-1, the switching regulator controller 230-1 may calculate the sum of the output voltage V1_OUT value of the LDO regulator 220-1 stored in the register 260-2, the dropout voltage V_DROPOUT value of the LDO regulator 220-1 estimated from the output current I1_OUT of the LDO regulator 220-1, and the drop voltage V_PDN value caused by the PDN 400-1. Similarly, the switching regulator controller 230-1 may calculate the sum of the output voltage V2_OUT value of the LDO regulator 220-2 stored in the register 260-3, the dropout voltage V_DROPOUT value of the LDO regulator 220-2 estimated from the output current I2_OUT of the LDO regulator 220-2, and the drop voltage V_PDN value caused by the PDN 400-2.

Thereafter, the switching regulator controller 230-1 may compare the sum value for the LDO regulator 220-1 with the sum value for the LDO regulator 220-2, and may determine the magnitude of the converted voltage V1_C generated by the switching regulator 210-1 based on the LDO regulator based on the greatest sum value. For example, the switching regulator 210-1 may be controlled so that the greatest sum value among the sum values of each LDO regulator is identical to the value of the converted voltage V1_C.

In this way, because the converted voltage V1_C generated by the switching regulator 210-1 is determined based on the LDO regulator with the greatest sum of the output voltage value, dropout voltage value, and voltage drop value caused by the PDN, other LDO regulators may have a large difference in input/output voltage, which may reduce a power efficiency in the absence of dynamic adjustment of V1_C.

For example, a situation may arise in which the LDO regulator which becomes a reference of the converted voltage V1_C value, that is, the LDO regulator with the greatest sum of the output voltage value, dropout voltage value, and voltage drop value caused by PDN, does not operate. For example, when the power of a consumer to which an output voltage (or output current) is supplied from the LDO regulator that is the reference for the converted voltage V1_C value is turned off, the LDO regulator may not generate an output voltage. Even in such a case, when the converted voltage V1_C value is set based on the sum of the output voltage value of the corresponding LDO regulator (e.g., without dynamically selecting a new reference LDO regulator), the dropout voltage value, and the voltage drop value caused by the PDN, the power efficiency of the remaining LDO regulators may drop unnecessarily.

Thus, according to some implementations, the switching regulator controller 230-1 may dynamically control the converted voltage V1_C that is output from the switching regulator 210-1, based on the output voltage of each LDO regulator, the dropout voltage, and the voltage drop caused by the PDN corresponding to the LDO regulator.

As a result, the efficiency of the LDO regulators 220-1 and 220-2 may be improved by reducing the input/output voltage difference between the LDO regulators 220-1 and 220-2, and as a result, the overall conversion efficiency of the power management device 200-1 may be improved.

Figure 2:
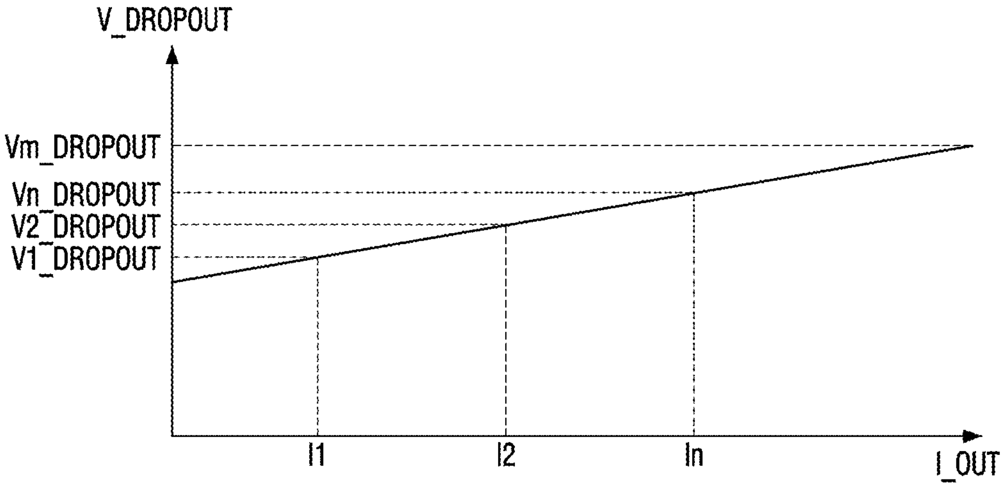
FIG. 2 is a graph illustrating a relationship between the output current and the dropout voltage of an LDO regulator according to some implementations.
Figure 3:
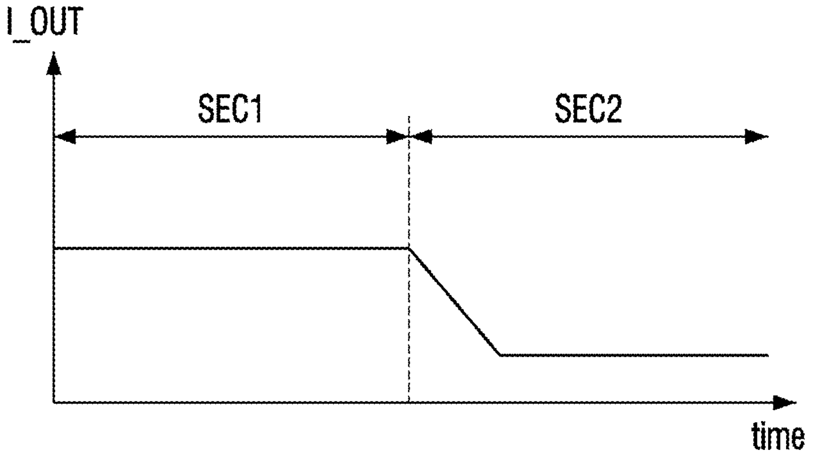
FIG. 3 is a graph illustrating the output current over time of an LDO regulator according to some implementations.

FIG. 2 is a graph for explaining a relationship between the output current and the dropout voltage of the LDO regulator according to some implementations. FIG. 3 is a graph for explaining the output current over time of the LDO regulator according to some implementations. Hereinafter, a method by which the switching regulator controller 230-1 estimates the dropout voltage V_DROPOUT of each of the LDO regulators 220-1 and 220-2, based on each of the output currents I1_OUT and I2_OUT of the LDO regulators 220-1 and 220-2 will be explained with reference to FIGS. 2 and 3.

First, referring to FIG. 2, a horizontal axis represents an output current I_OUT of the LDO regulator (e.g., 220-1 and 220-2), and a vertical axis represents a dropout voltage V_DROPOUT.

A maximum dropout voltage Vm_DROPOUT may be a characteristic value predefined for the LDO regulator. Therefore, the input voltage of the LDO regulator may be controlled to be equal to or greater than the sum of the output voltage and the maximum dropout voltage Vm_DROPOUT. However, when the output current I_OUT of the LDO regulator increases, the dropout voltage V_DROPOUT also increases, and when the output current I_OUT of the LDO regulator decreases, the dropout voltage V_DROPOUT may also decrease.

For example, the dropout voltage V1_DROPOUT corresponding to the first current information I1 may be lower than the dropout voltage V2_DROPOUT corresponding to the second current information I2, and the dropout voltage V2_DROPOUT corresponding to the second current information I2 may be lower than a dropout voltage Vn_DROPOUT corresponding to a n-th current information In. Therefore, it is possible to estimate a decrease in the dropout voltages V1_DROPOUT to Vn_DROPOUT based on the first to n-th current information I1 to In, thereby reducing the converted voltage V1_C that is output from the switching regulator 210-1.

Next, referring to FIG. 3, the horizontal axis represents time, and the vertical axis represents the output current I_OUT of an LDO regulator (e.g., 220-1 or 220-2). The output current I_OUT may have a relatively high value in a first section SEC1 (a first time interval), and the output current I_OUT may have a relatively low value in a second section SEC2.

The current sensors 240-1 and 240-2 may detect output currents of each of the connected LDO regulators 220-1 and 220-2. The switching regulator controller 230-1 may receive the output currents I1_OUT and I2_OUT from the current sensors 240-1 and 240-2, and may estimate dropout voltage V_DROPOUT of each of the LDO regulators 220-1 and 220-2 based on the received output currents I1_OUT and I2_OUT.

For example, since the output current I_OUT in the second section SEC2 is lower than that in the first section SEC1, the switching regulator controller 230-1 may estimate that the dropout voltage V_DROPOUT at the second section SEC2 will be lower than the first section SEC1. At this time, the switching regulator controller 230-1 may estimate the dropout voltage V_DROPOUT of each of the LDO regulators 220-1 and 220-2 based on the graphs of FIGS. 2 and 3.

Next, the switching regulator controller 230-1 may generate a voltage control signal VCS1 based on the estimated dropout voltage V_DROPOUT, and provide the generated control signal VCS1 to the switching regulator 210-1, thereby adjusting the converted voltage V1_C that is output from the switching regulator 210-1. Because a value is estimated for V_DROPOUT, where the estimated value can be less than the maximum dropout voltage Vm_DROPOUT, the sum MAX (V_OUT+V_DROPOUT+V_PDN) can correspondingly be lower, and the voltage V1_C that is output from the switching regulator 210-1 may be controlled to a lower, more accurate, and more efficient minimum voltage necessary for the operation of the LDO regulators 220-1 and 220-2

Figure 4:
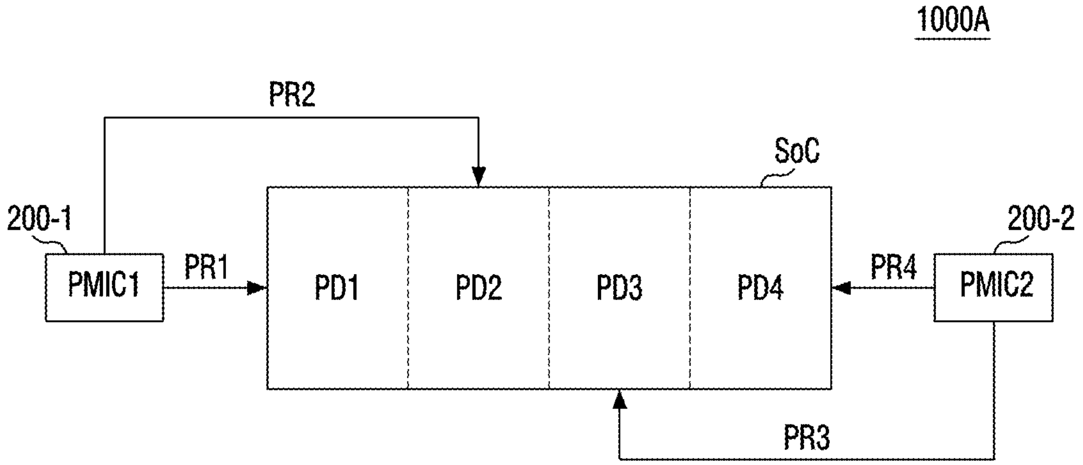
FIG. 4 is a diagram illustrating a plurality of power management devices.

FIG. 4 is a schematic diagram illustrating a plurality of power management devices supplying power to a system-on-chip. Referring to FIG. 4, an electronic device 1000A may include a plurality of power management devices 200-1 and 200-2 and a system-on-chip (SoC). The system-on-chip may be divided into a plurality of power domains that each operate by being provided with different voltages from each other. Each of the plurality of power domains may include at least one functional block. As the structure of the system-on-chip becomes complicated, the number of functional blocks included in the system-on-chip may increase, and thus, the number of power domains of the system-on-chip may also increase.

At this time, when one power management device supplies power to all power domains of the system-on-chip, an electrical path through which power is supplied becomes complicated, the resistance on the path through which power is supplied to the power domains may increase, and the power efficiency may decrease. Accordingly, in some implementations, the plurality of power management devices which supply different voltages to one system-on-chip may be disposed to improve the power efficiency.

For example, the power domains PD1 and PD2 of the system-on-chip may be supplied with voltage from the power management device 200-1 disposed to be adjacent through the power rail PR1 and the power rail PR2, respectively. Similarly, the power domains PD3 and PD4 of the system-on-chip may be supplied with voltage from the power management device 200-2 physically disposed in close proximity to each other through the power rail PR3 and the power rail PR4, respectively. In this way, the number of power management devices included in one electronic device may vary depending on the implementation. For example, eight power management devices may be included in the electronic device in some implementations, though the number is not limited thereto.

Figure 5:
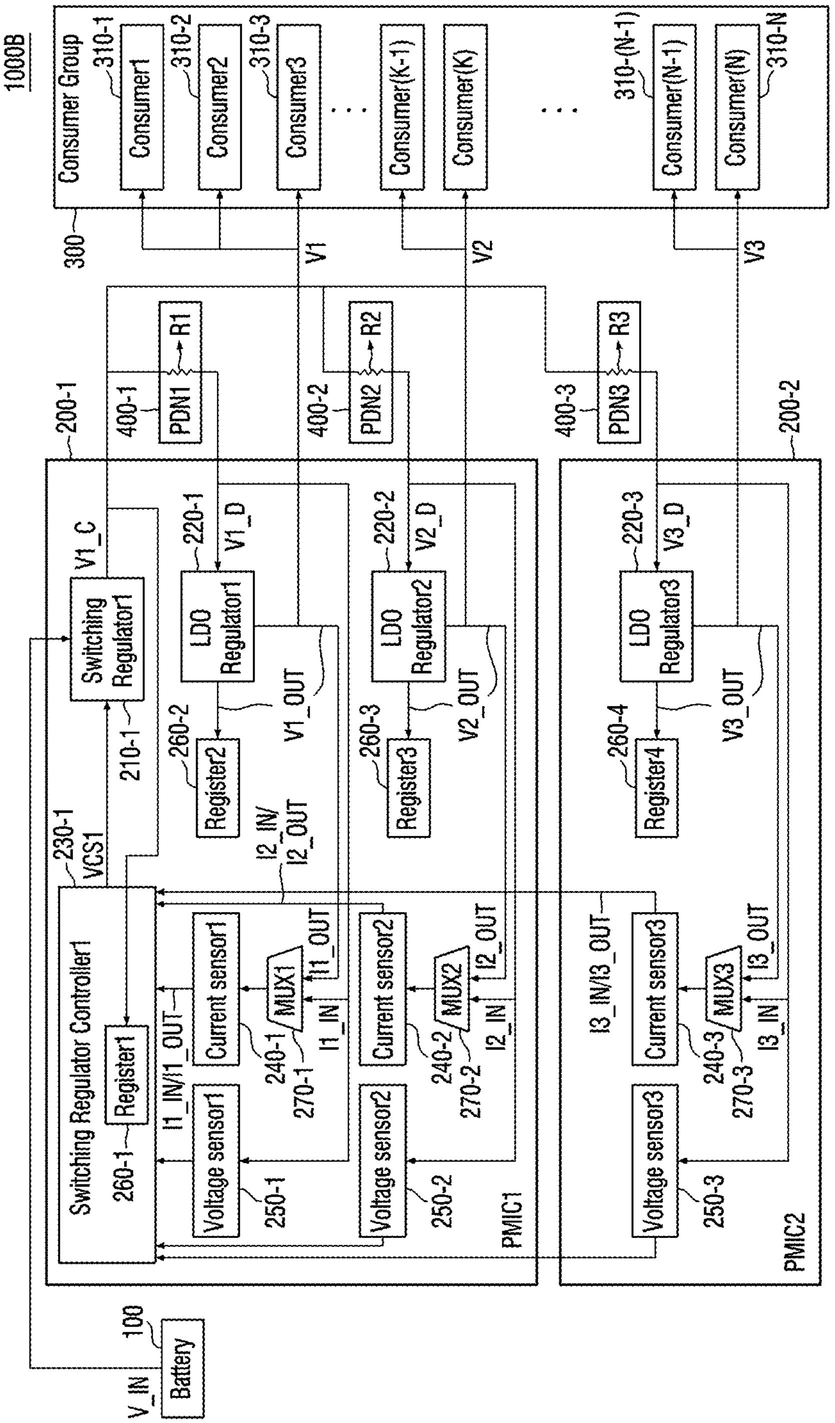
FIG. 5 is a diagram illustrating an electronic device including a power management device according to some implementations.

FIG. 5 is a diagram illustrating an electronic device including a power management device according to some implementations. Hereinafter, repeated explanations of those of the example of FIG. 1 will be omitted; the description provided with respect to elements of FIG. 1 can equally apply to corresponding elements of FIG. 5, except where noted otherwise or suggested otherwise from context.

Referring to FIG. 5, an electronic device 1000B may further include a second power management device 200-2. The power management device 200-2 may further include an LDO regulator 220-3, a voltage sensor 250-3, a current sensor 240-3, a multiplexer 270-3, and a register 260-4. The LDO regulator 220-3 is grouped together with LDO regulators 220-1 and 220-2, and may be connected to the switching regulator 210-1 in a multi-stage structure. The LDO regulator 220-3 may receive the converted voltage V1_C from the switching regulator 210-1 and generate the output voltage V3_OUT. The output voltage V3_OUT generated by the LDO regulator 220-3 may be provided to the consumer group 300 in the form of voltage V3. For example, the power management device 200-1 may provide the voltage V3 to some consumers included in the consumer group 300. Further, the output voltage V3_OUT of the LDO regulator 220-3 may be stored in the register 260-4.

The voltage that is input to the LDO regulator 220-3 may be a drop voltage V3_D which is generated when the converted voltage V1_C output from the switching regulator 210-1 drops by the resistor R3 of the PDN 400-3 while going through the PDN 400-3. The voltage sensor 250-3 may sense the drop voltage V3_D that is input to the LDO regulator 220-3, and the current sensor 240-3 may selectively sense either the input current I3_IN or the output current I3_OUT of the LDO regulator 220-3 through the multiplexer 270-3.

The switching regulator controller 230-1 may receive the drop voltage V3_D value and input current I3_IN value that are input to the LDO regulator 220-3 from the voltage sensor 250-3 and the current sensor 240-3, and may calculate the voltage drop value caused by PDN 400-3 based on this. Further, the output voltage V3_OUT value of the LDO regulator 220-3 stored in the register 260-4 may be known. Furthermore, the switching regulator controller 230-1 may estimate the dropout voltage V_DROPOUT of the LDO regulator 220-3 from the output current I3_OUT of the LDO regulator 220-3 received from the current sensor 240-3.

In this way, the switching regulator controller 230-1 may calculate the sum of the output voltage value of the LDO regulator, the dropout voltage value of the LDO regulator, and the voltage drop value caused by the PDN corresponding to the LDO regulator, not only on the LDO regulators 220-1 and 220-2 disposed in the same power management device 200-1 but also on the LDO regulator 220-3 disposed in the different power management device 200-2. In addition, the switching regulator controller 230-1 may compare the calculated sum values of the LDO regulators 220-1, 220-2, and 220-3, and generate the voltage control signal VCS1 that controls the switching regulator 210-1 so that the sum value of the LDO regulator with the greatest sum value is identical to the converted voltage V1_C.

Figure 6:
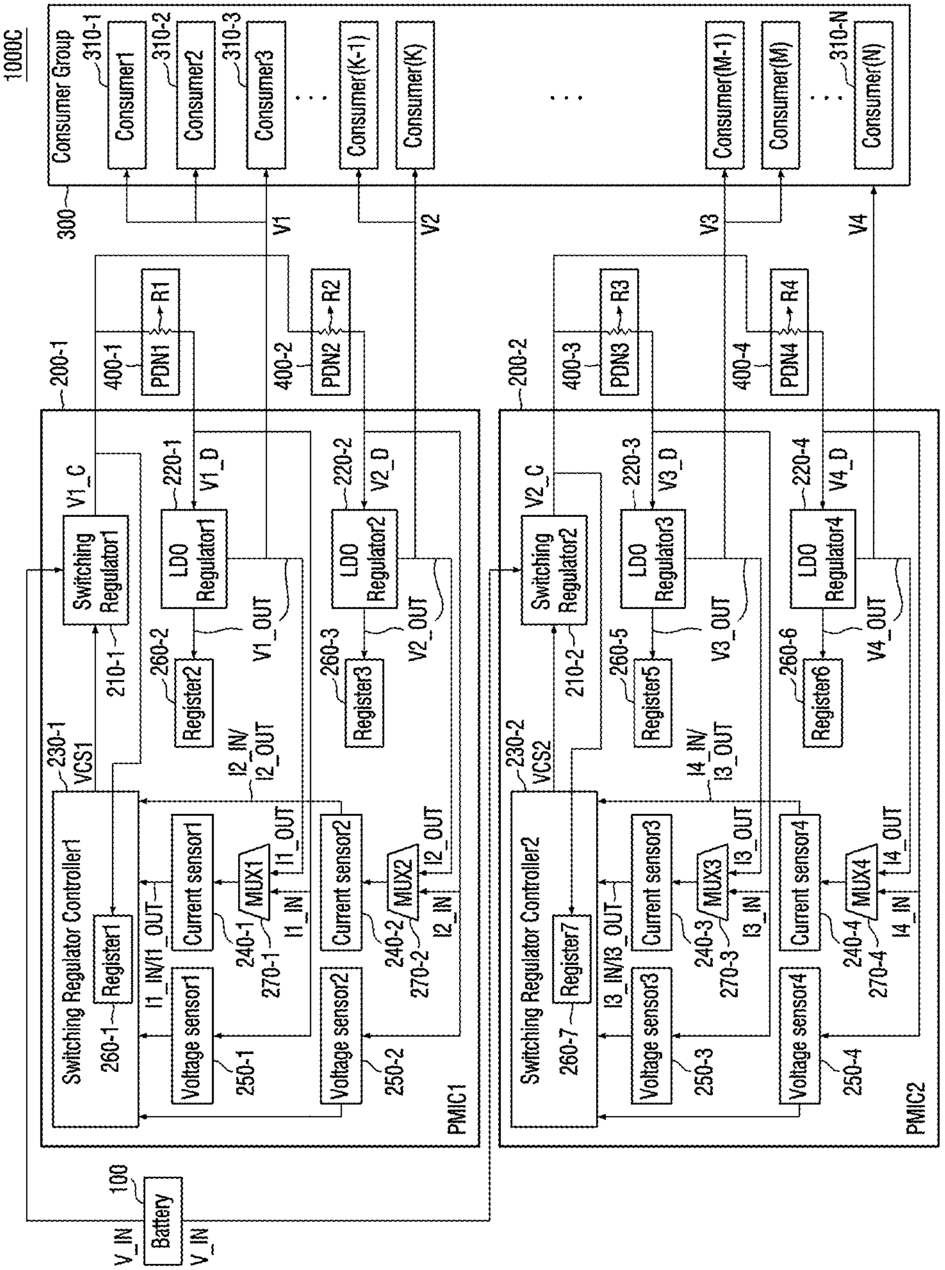
FIG. 6 is a diagram illustrating an electronic device including a power management device according to some implementations.

FIG. 6 is a diagram illustrating an electronic device including a power management device according to some implementations. Hereinafter, repeated explanations of those of the previous examples will be omitted; the description provided with respect to elements of FIGS. 1 and 5 can equally apply to corresponding elements of FIG. 6, except where noted otherwise or suggested otherwise from context.

Referring to FIG. 6, an electronic device 1000C may further include a power management device 200-2. The power management device 200-2 may include a switching regulator controller 230-1, a switching regulator 210-2, LDO regulators 220-3 and 220-4, current sensors 240-3 and 240-4, voltage sensors 250-3 and 250-4, registers 260-5, 260-6 and 260-7, and multiplexers 270-3 and 270-4.

The power management device 200-2 may have a structure similar to that of the power management device 200-1. For example, the switching regulator 210-2 may receive the input voltage V_IN from the battery 100 and generate a converted voltage V2_C. At this time, the magnitude of the converted voltage V2_C may be different from the magnitude of the converted voltage V1_C. The converted voltage V2_C that is output from the switching regulator 210-2 may drop, while going through the PDN 400-3 having the resistor R3. Accordingly, the drop voltage V3_D may be input to the LDO regulator 220-3. Moreover, the converted voltage V2_C that is output from the switching regulator 210-2 may drop, while going through the PDN 400-4 having a resistor R4. Accordingly, the drop voltage V4_D may be input to the LDO regulator 220-4.

The voltage sensor 250-3 may sense the drop voltage V3_D that is input to the LDO regulator 220-3, and may transmit the sensed drop voltage V3_D value to the switching regulator controller 230-2. The input current I3_IN and the output current I3_OUT of the LDO regulator 220-3 may be input to the multiplexer 270-3, and the multiplexer 270-3 may transmit either one of the currents to the current sensor 240-3. The current sensor 240-3 may sense the received current, and transmit the sensed current value to the switching regulator controller 230-2.

The switching regulator controller 230-2 may calculate the voltage drop caused by the PDN 400-3, based on the drop voltage V3_D value that is received from the voltage sensor 250-3 and input to the LDO regulator 220-3, and the input current I3_IN value of the LDO regulator 220-3 received from the current sensor 240-3. Also, the switching regulator controller 230-2 may also know the output voltage V3_OUT value of the LDO regulator 220-3 stored in the register 260-5. Furthermore, the switching regulator controller 230-2 may estimate the dropout voltage of the LDO regulator 220-3, based on the output current I3_OUT value of the LDO regulator 220-3 received from the current sensor 240-3. Based on this, the switching regulator controller 230-2 may calculate the sum of the output voltage value of the LDO regulator 220-3, the dropout voltage value, and the voltage drop value caused by the PDN 400-3.

Similarly, the switching regulator controller 230-2 may calculate the voltage drop value caused by the PDN 400-4, based on the voltage drop V4_D value that is received from the voltage sensor 250-4 and input to the LDO regulator 220-4, and the input current I4_IN value of the LDO regulator 220-4 received from the current sensor 240-4. Furthermore, the switching regulator controller 230-2 may estimate the dropout voltage of the LDO regulator 220-4, based on the output current I4_OUT value of the LDO regulator 220-4 received from the current sensor 240-4. Based on this, the switching regulator controller 230-2 may calculate the sum of the output voltage value of the LDO regulator 220-4, the dropout voltage value, and the voltage drop value caused by the PDN 400-4.

In this way, the switching regulator controller 230-2 may obtain the converted voltage V2_C from the switching regulator 210-2, for example, calculate the sum value of each output voltage value of the grouped LDO regulators connected to the switching regulator 210-4 in a multi-stage structure, the dropout voltage value, and the voltage drop value caused by the PDN corresponding to the LDO regulator, and may generate the voltage control signal VCS2 that dynamically controls the switching regulator 210—such that the maximum value of the sum values is equal to the value of the converted voltage V2_C, and transmit VCS2 to the switching regulator 210-2.

The converted voltage V2_C of the switching regulator 210-2 may be stored in the register 260-7, and the output voltage V4_OUT generated by the LDO regulator 220-4 may be provided to the consumer group 300 in the form of voltage V4.

In this way, when one electronic device includes a plurality of power management devices and each power management device includes a switching regulator, each power management device may include a switching regulator controller that corresponds one-to-one to the front end of the switching regulator. Further, the switching regulator controller may perform an operation for controlling the corresponding switching regulator independently of other switching regulator controllers included in other power management devices.

Figure 7:
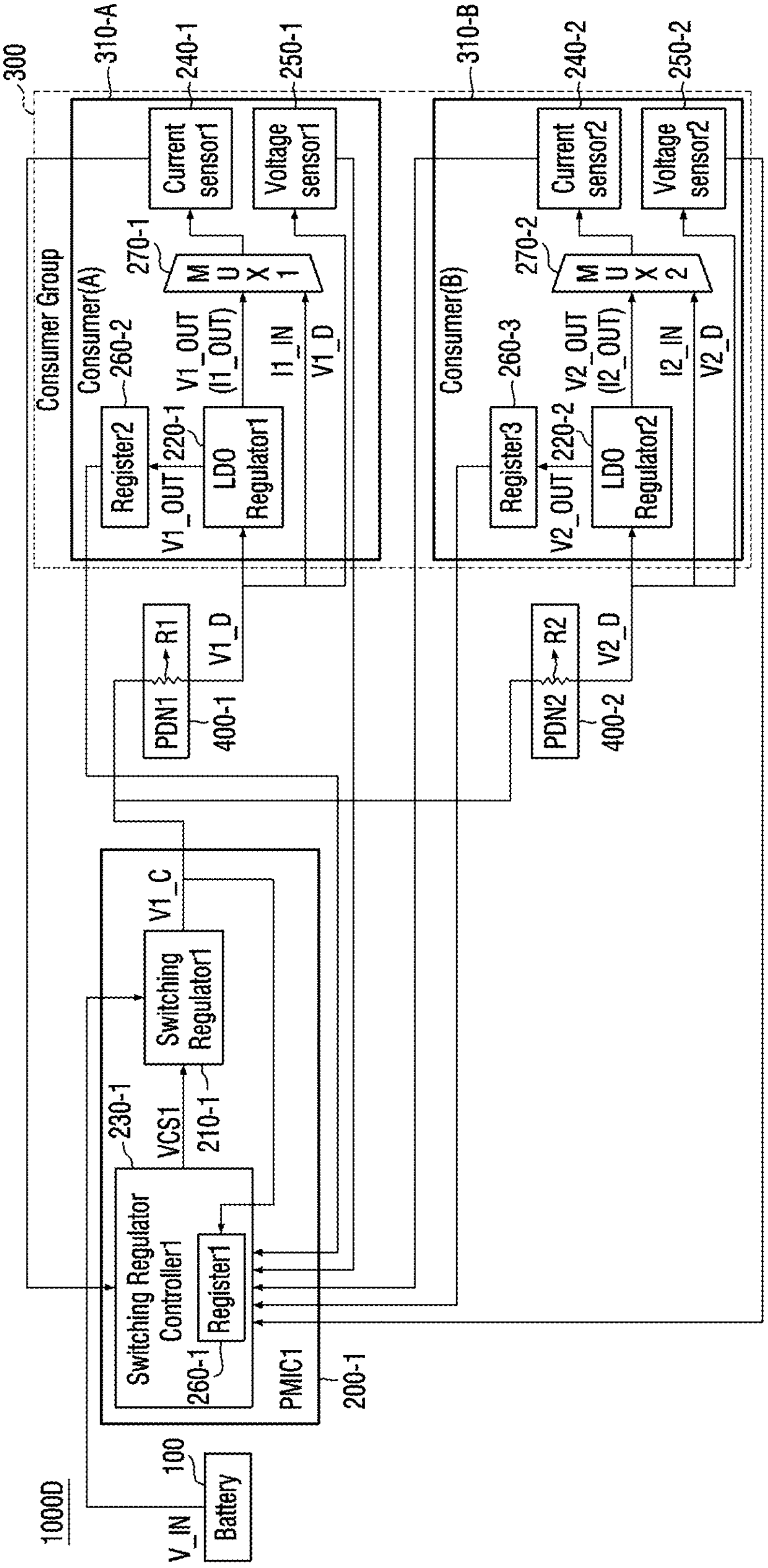
FIGS. 7 and 8 are a system diagram and a cross-sectional diagram, respectively, illustrating an electronic device including a power management device according to some implementations.
Figure 8:
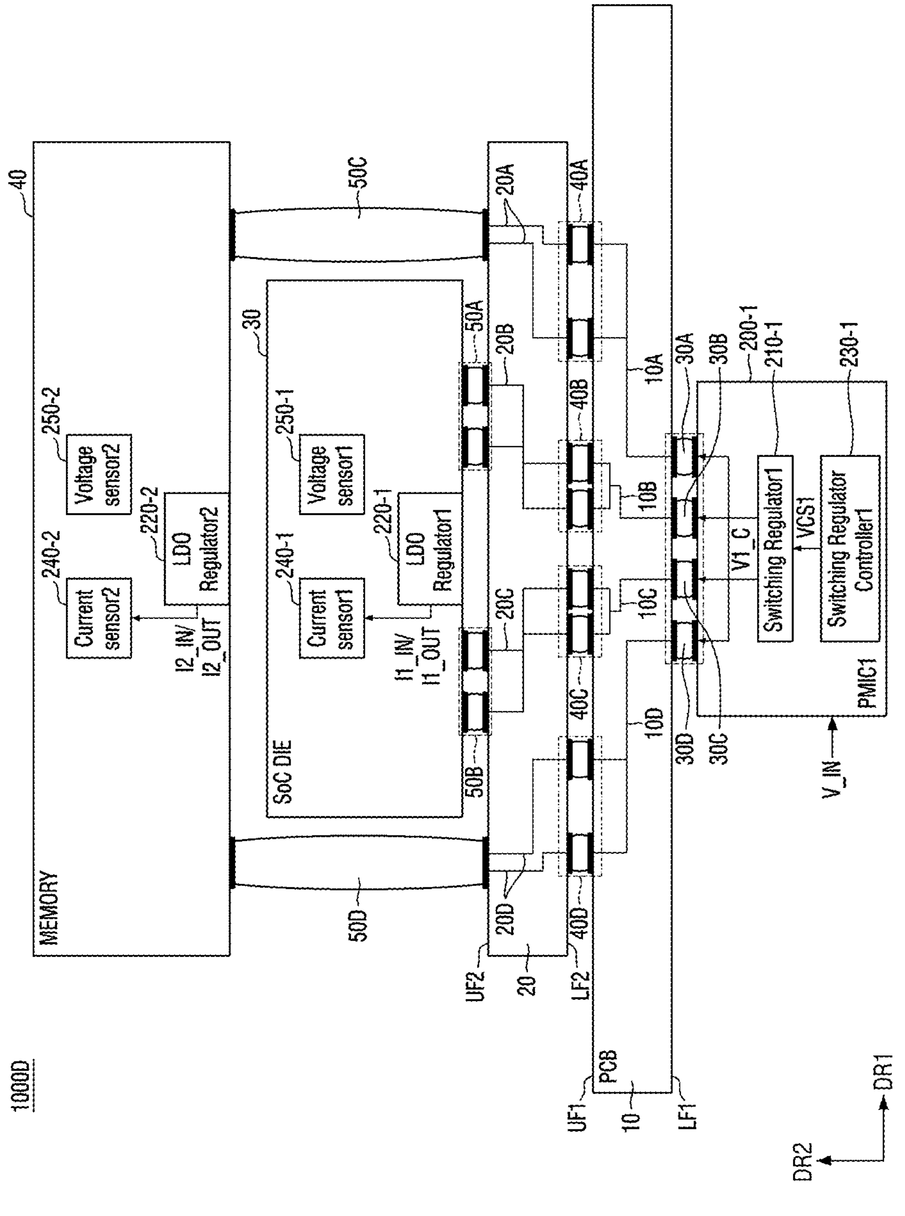

FIGS. 7 and 8 are diagrams illustrating an electronic device including a power management device according to some implementations. The description provided with respect to elements of FIGS. 1, 5, and 6 can equally apply to corresponding elements of FIGS. 7 and 8, except where noted otherwise or suggested otherwise from context.

First, referring to FIG. 7, LDO regulators 220-1 and 220-2 included in an electronic device 1000D may be included in each of the consumer 310-A and 310-B included in the consumer group 300, e.g., instead of or in addition to being included in the power management device 200-1. For example, the LDO regulator 220-1 may be included in the consumer 310-A, and the LDO regulator 220-2 may be included in the consumer 310-B. Further, a voltage sensor 250-1 that senses the drop voltage V1_D input to the LDO regulator 220-1, a current sensor 240-1 that senses one of the input current I1_IN and the output current I1_OUT of the LDO regulator 220-1, a multiplexer 270-1 that selects either the input current I1_IN or the output current I1_OUT of the LDO regulator 220-1 and transmits it to the current sensor 240-1, and a register 260-2 that stores the output voltage V1_OUT of the LDO regulator 220-1 may be included in the consumer 310-A.

The voltage sensor 250-1 disposed in the consumer 310-A senses the drop voltage V1_D that is input to the LDO regulator 220-1, and may transmit the sensed voltage value to the switching regulator controller 210-1. The current sensor 240-1 disposed in the consumer 310-A may transmit the sensed input current I1_IN and output current I1_OUT of the LDO regulator 220-1 to the switching regulator controller 230-1. Further, the output voltage V1_OUT of the LDO regulator 220-1 stored in the register 260-2 may be transmitted to the switching regulator controller 230-1.

Further, a voltage sensor 250-2 that senses the drop voltage V2_D that is input to the LDO regulator 220-2, a current sensor 240-2 that senses either the input current I2_IN or the output current I2_OUT of the LDO regulator 220-2, a multiplexer 270-2 that selects either the input current I2_IN or the output current I2_OUT of the LDO regulator 220-2 and transmits it to the current sensor 240-2, and a register 260-3 that stores the output voltage V2_OUT of the LDO regulator 220-2 may be included in the consumer 310-B.

The voltage sensor 250-2 disposed in the consumer 310-B may transmit the sensed drop voltage V2_D, which is input to the LDO regulator 220-2, to the switching regulator controller 230-1, and the current sensor 240-2 disposed in the consumer 310-B may transmit the sensed input current I2_IN and output current I2_OUT of the LDO regulator 220-2 to the switching regulator controller 230-1. Further, the output voltage V2_OUT of the LDO regulator 220-2 stored in the register 260-3 may be transmitted to the switching regulator controller 230-1.

Accordingly, the switching regulator controller 230-1 may calculate the sum of the output voltage V1_OUT of the LDO regulator 220-1, the dropout voltage of the LDO regulator 220-1, and the voltage drop caused by the PDN 400-1, and may calculate the sum of the output voltage V2_OUT of the LDO regulator 220-2, the dropout voltage of the LDO regulator 220-2, and the voltage drop caused by the PDN 400-2.

The switching regulator controller 230-1 may generate a voltage control signal VCS1 for controlling the switching regulator 210-1 so that the maximum value among the sum values calculated for each LDO regulator is equal to the value of the converted voltage V1_C, and may transmit the generated voltage control signal VCS1 to the switching regulator 210-1.

Referring to FIG. 8, as discussed with respect to FIG. 7, the electronic device 1000D may include a power management device 200-1, a printed circuit board 10, a package substrate 20, LDO regulators 220-1 and 220-2, an integrated circuit die 30, and a memory die 40.

The printed circuit board 10 may include a first side UF1 and a second side LF1 that are opposite to each other in a second direction DR2. The printed circuit board 10 may also include electrical paths 10A, 10B, 10C and 10D. The electrical paths may electrically connect one or more components disposed on at least one of the first side UF1 and the second side LF1 to each other. The electrical paths may be formed of a material that is electrically conductive. For example, the electrical paths may include electrical paths for providing operating voltages, and electrical paths for transmitting signals.

The printed circuit board 10 may be a circuit board or substrate that may provide electrical paths (or electrical communication channels) between one or more components disposed on at least one among the first side UF1 and the second side LF1.

The printed circuit board 10 may include a plurality of metal layers separated from each other by one or more dielectric material layers, and the plurality of metal layers may be interconnected to each other through conductive vias.

The package substrate 20 may be attached to the first side UF1 of the printed circuit board 10 through the connecting materials 40A, 40B, 40C, and 40D. In some implementations, the connecting materials 40A, 40B, 40C, and 40D may be implemented with electrically conductive materials. For example, the electrically conductive materials may be implemented as, but is not limited to, pads, pins, land pads, solder balls, copper pads, and/or combinations thereof.

The connecting material described in this disclosure may include a ball and pads connected to the top and bottom of the ball. Accordingly, the ball described below may mean a component that includes the ball and pads. Although a pad is shown as one example of the connecting means in FIGS. 8, 10, and 12, the connecting means are not limited to the pads.

The package substrate 20 may include a first side UF2 and a second side LF2 that are opposite to each other in the second direction DR2. The package substrate 20 may include electrical paths 20A, 20B, 20C, and 20D, such as electrical paths 10A, 10B, 10C, and 10D of the printed circuit board 10. The electrical paths 20A, 20B, 20C, and 20D may electrically connect one or more components disposed on at least one of the first side UF2 and the second side LF2 to each other. The electrical paths may be formed of materials that have electrical conductivity. For example, the electrical paths may include electrical paths for providing an operating voltage, and electrical paths for transmitting a signal.

Each of the printed circuit board 10 and the package substrate 20 may have a length extending in a first direction DR1 that intersects the second direction DR2, and a thickness extending in the second direction DR2. The power management device 200-1, the printed circuit board 10, the package substrate 20, the integrated circuit die 30, and the memory die 40 may be disposed along the second direction DR2.

The power management device 200-1 may be, for example, a PMIC chip. The power management device

200-1 may be attached to the second side LF1 of the printed circuit board 10 through the connecting materials 30A, 30B, 30C, and 30D. The connecting materials 30A, 30B, 30C, and 30D may include conductive materials including pads, pins, pin pads, solder balls, and/or copper pads.

The integrated circuit die 30 may be attached to the first side UF2 of the package substrate 20 through the connecting materials 50A and 50B. The connecting materials 50A and 50B may include electrically conductive materials. The integrated circuit die 30 may be at least one of a microprocessor, a graphics processor, a signal processor, a network processor, a chipset, an application processor, a modem integrated circuit, a radio frequency integrated circuit, a flash memory, and a system-on-chip (SoC).

The memory die 40 is attached to the first side UF2 of the package substrate 20 through the connecting materials 50C and 50D, and may be disposed on the integrated circuit die 30. The connecting materials 50C and 50D may include electrically conductive materials. The memory die 40 may include at least one of a DRAM device and a NAND flash memory device including a controller, but the memory type is not limited thereto.

Referring to FIGS. 7 and 8 together, the converted voltage V1_C generated by the switching regulator 210-1 of the power management device 200-1 that receives the input voltage V_IN from the battery 100 may reach the LDO regulator 220-1 in the integrated circuit die 30 via connecting materials 30B and 30C, electrical paths 10B and 10C, connecting materials 40B and 40C, electrical paths 20B and 20C, and connecting materials 50A and 50B. In this way, the connecting materials and electrical paths until the converted voltage V1_C output from the switching regulator 210-1 reaches the LDO regulator 220-1 in the integrated circuit die 30 may correspond to the PDN 400-1 of FIG. 7, and the total resistance value due to the connecting materials and the electrical paths may correspond to the resistor R1 value of the PDN 400-1.

Furthermore, the converted voltage V1_C generated by the switching regulator 210-1 of the power management device 200-1 that receives the input voltage V_IN from the battery 100 may reach the LDO regulator 220-2 in the memory die 40 via the connecting materials 30A and 30D, the electrical paths 10A and 10D, the connecting materials 40A and 40D, the electrical paths 20A and 20D, and the connecting materials 50C and 50D. In this way, the connecting materials and electrical paths until the converted voltage V1_C output from the switching regulator 210-1 reach the LDO regulator 220-2 in the memory die 40 may correspond to the PDN 400-2 of FIG. 7, and the total resistance value due to the materials and electrical paths may correspond to the resistor R2 value of the PDN 400-2.

In this way, the converted voltage V1_C that is output from the switching regulator 210-1 may be input to the LDO regulator 220-1 in the integrated circuit die 30 or the LDO regulator 220-2 in the memory die 40 via (or passed through) the PDN 400-1 or the PDN 400-2. In this process, a voltage drop occurs due to the electrical paths in the printed circuit board 10 and the package substrate 20 and/or the connecting material between the substrates/boards, and a voltage lowered from the converted voltage V1_C may be input to each of the LDO regulators 220-1 and 220-2.

Because a current sensor 240-1 that senses the input current I1_IN or output current I1_OUT of the LDO regulator 220-1, and a voltage sensor 250-1 that senses the output voltage V1_OUT of the LDO regulator 220-1, are included in the integrated circuit die 30, the switching regulator controller 230-1 may calculated the voltage drop caused by the connecting materials 30B, 30C, 40B, 40C, 50A and 50B and the electrical paths 10B, 10C, 20B and 20C between the switching regulator 210-1 and the LDO regulator 220-1.

Similarly, because a current sensor 240-2 that senses the input current I2_IN or output current I2_OUT of the LDO regulator 220-2, and a voltage sensor 250-2 that senses the output voltage V2_OUT of the LDO regulator 220-2 are included in the memory die 40, the switching regulator controller 230-1 may calculate the voltage drop caused by the connecting material 30A, 30D, 40A, 40D, 50C and 50D and the electrical paths 10A, 10D, 20A and 20D between the switching regulator 210-1 and the LDO regulator 220-2.

Figure 9:
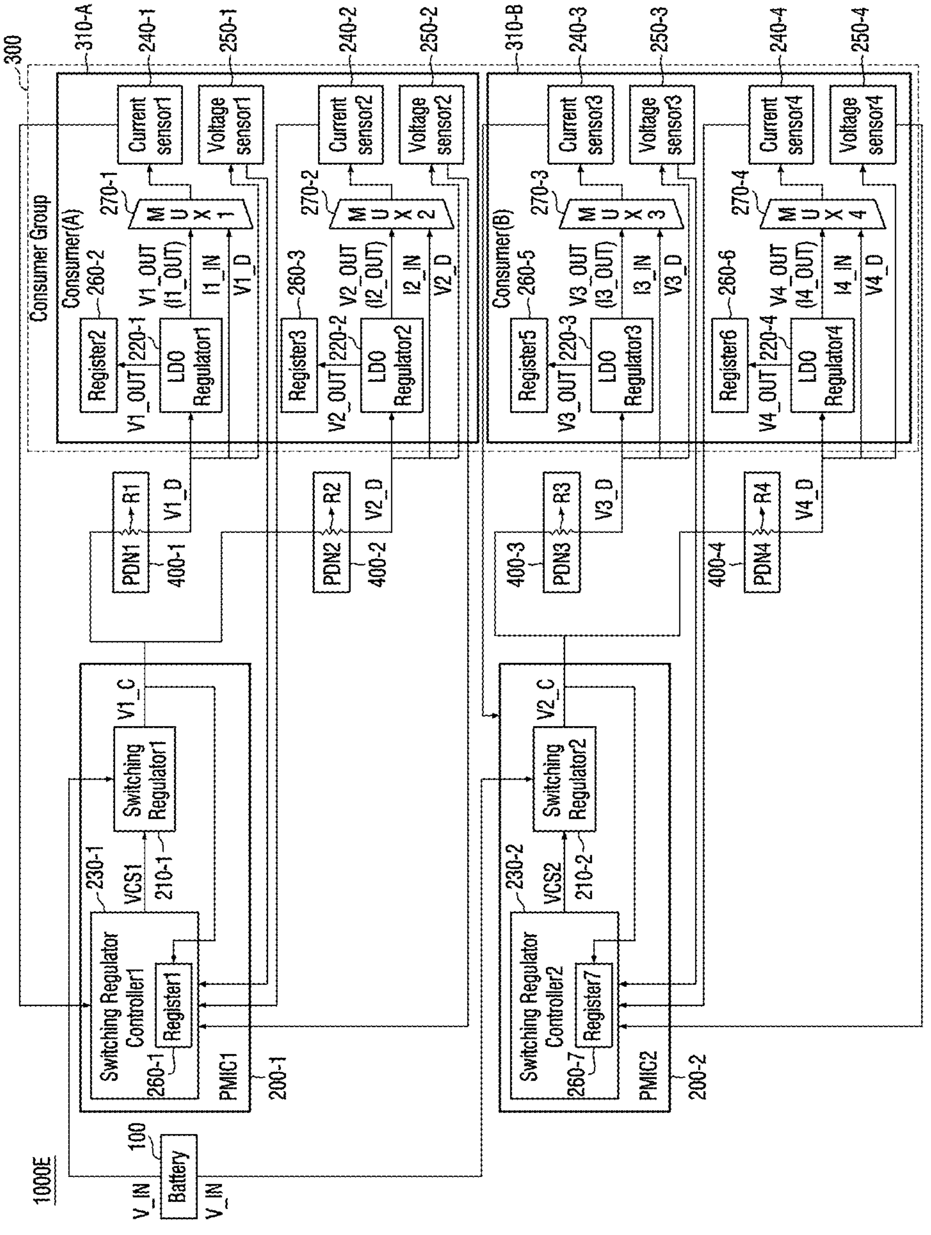
FIGS. 9 and 10 are a system diagram and a cross-sectional diagram, respectively, illustrating an electronic device including a power management device according to some implementations.
Figure 10:
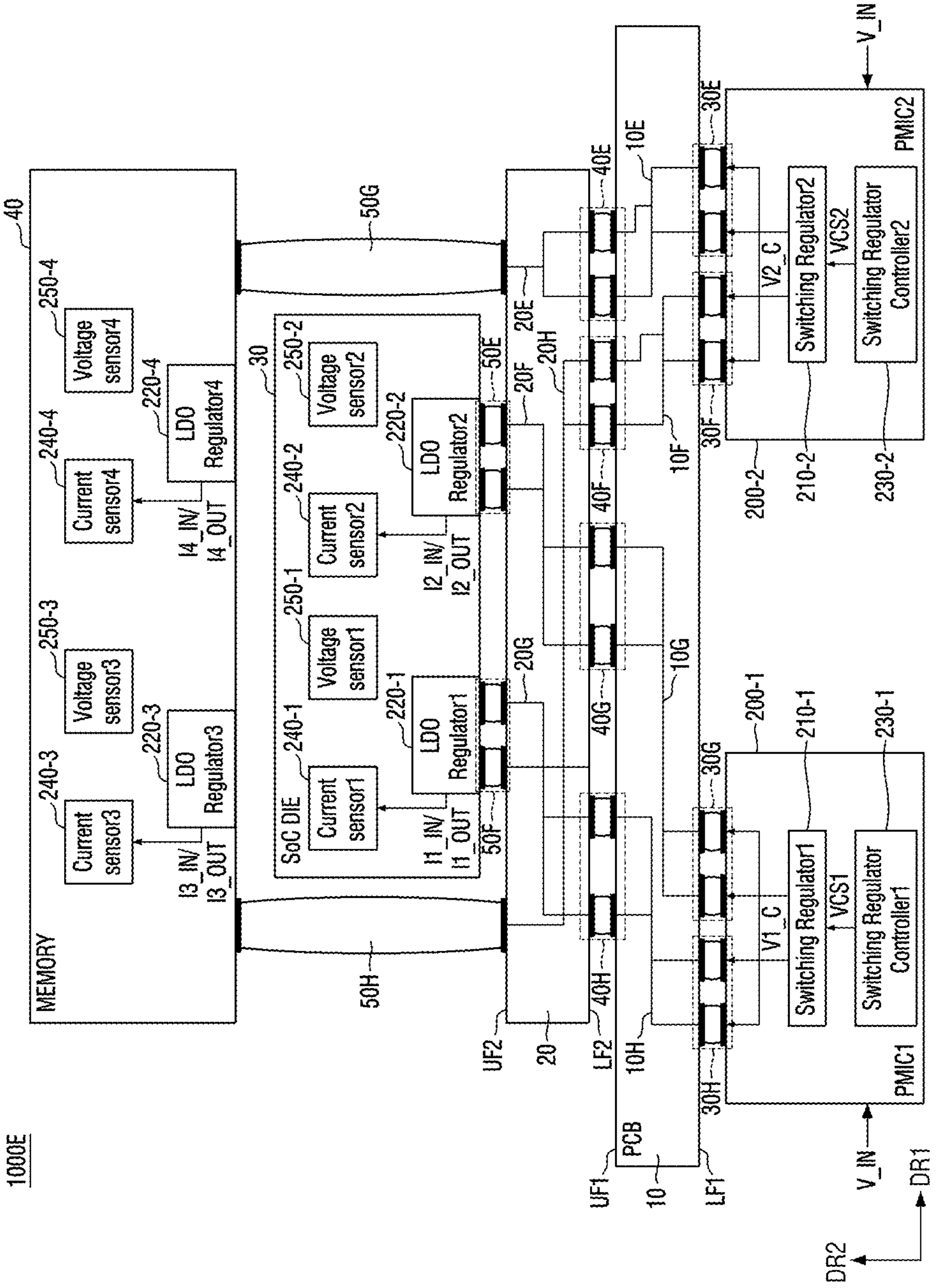

FIGS. 9 and 10 are diagrams illustrating an electronic device including a power management device according to some implementations. Hereinafter, repeated explanations of those of the previous examples will be omitted; the description provided with respect to elements of FIGS. 1 and 5-8 can equally apply to corresponding elements of FIGS. 9 and 10, except where noted otherwise or suggested otherwise from context.

Referring first to FIG. 9, an electronic device 1000E may include a plurality of power management devices 200-1 and 200-2, and each of the power management devices 200-1 and 200-2 may include switching regulators 210-1 and 210-2 that receive an input voltage V_IN from a battery 100, and switching regulator controllers 230-1 and 230-2 that generate a voltage control signal VCS1 or a voltage control signal VCS2 for controlling each of the switching regulators 210-1 and 210-2, and transmit it to each of the switching regulators 210-1 and 210-2.

LDO regulators 220-1 and 220-2 that are connected to the switching regulator 210-1 in a multi-stage structure and receive the converted voltage V1_C may be included in the consumer 310-A, and current sensors 240-1 and 240-2, voltage sensors 250-1 and 250-2, and multiplexers 270-1 and 270-2 corresponding to each of the LDO regulators 220-1 and 220-2 may be included in the consumer 310-A. Values sensed by the current sensors 240-1 and 240-2, the voltage sensors 250-1 and 250-2, and the output voltage V1_OUT and V2_OUT values of the LDO regulators 220-1 and 220-2 each stored in the registers 260-2 and 260-3 may be transmitted to the switching regulator controller 230-1, and the switching regulator controller 230-1 may dynamically control the converted voltage V1_C generated by the switching regulator 210-1, based on the received values.

Similarly, LDO regulators 220-3 and 220-4 that are connected to the switching regulator 210-2 in a multi-stage structure and receive the converted voltage V2_C may be included in the consumer 310-B, and current sensors 240-3 and 240-4, voltage sensors 250-3 and 250-4, and multiplexers 270-3 and 270-4 corresponding to each of the LDO regulators 220-3 and 220-4 may be included in the consumer 310-B. Values sensed by the current sensors 240-3 and 240-4 and the voltage sensors 250-3 and 250-4, and values of the output voltages V3_OUT and V4_OUT of the LDO regulators 220-3 and 220-4 stored in each of the registers 260-5 and 260-6 may be transmitted to the switching regulator controller 230-2, and the switching regulator controller 230-2 may dynamically control the converted voltage V2_C generated by the switching regulator 210-2 based on the received values.

Next, referring to FIGS. 9 and 10 together, the power management device 200-1 may be attached to the second side LF1 of the printed circuit board 10 through the connecting materials 30G and 30H, and the power management device 200-1 2 may be attached to the second side LF1 of the printed circuit board 10 through the connecting members 30E and 30F.

The converted voltage V1_C that is output from the switching regulator 210-1 may be input to the LDO regulator 220-1 in the integrated circuit die 30 through the connecting materials 30H, the electrical paths 10H, the connecting materials 40H, the electrical paths 20G, and the connecting materials 50F. In this way, the connecting materials 30G, 30H, 40H and 50F and the electrical paths 10H and 20G until the converted voltage V1_C output from the switching regulator 210-1 reaches the LDO regulator 220-1 in the integrated circuit die 30 may correspond to PDN 400-1 of FIG. 9, and the total resistance value due to the connecting materials and the electrical paths may correspond to the resistor R1 value of the PDN 400-1.

Furthermore, the converted voltage V1_C that is output from the switching regulator 210-1 may be input to the LDO regulator 220-2 in the integrated circuit die 30 through connecting materials 30G, electrical paths 10G, connecting materials 40G, electrical paths 20F, and connecting materials 50E. In this way, the connecting materials 30G, 40G, 50E and the electrical paths 10G and 20F until the converted voltage V1_C that is output from the switching regulator 210-1 reaches the LDO regulator 220-2 in the integrated circuit die 30 may correspond to the PDN 400-2 of FIG. 9, and the total resistance value due to the connecting materials and the electrical paths may correspond to the resistor R2 value of the PDN 400-2.

The converted voltage V2_C that is output from the switching regulator 210-2 may be input to the LDO regulator 220-3 in the memory die 40 through the connecting materials 30F, the electrical paths 10F, the connecting materials 40F, the electrical paths 20H, and the connecting materials 50H. In this way, the connecting materials 30F, 40F and 50H and the electrical paths 10F and 20H until the converted voltage V2_C that is output from the switching regulator 210-2 reaches the LDO regulator 220-3 in the memory die 40 may correspond to the PDN 400-3 of FIG. 9, and the total resistance value due to the connecting materials and the electrical paths may correspond to the resistor R3 value of the PDN 400-3.

In addition, the converted voltage V2_C that is output from the switching regulator 210-2 may be input to the LDO regulator 220-4 in the memory die 40 through the connecting members 30E, the electrical paths 10E, the connecting materials 40E, the electrical paths 20E, and the connecting materials 50G. In this way, the connecting materials 30E, 40E, and 50G and the electrical paths 10E and 20E until the converted voltage V2_C that is output from the switching regulator 210-2 reaches the LDO regulator 220-4 in the memory die 40 may correspond to the PDN 400-4 of FIG. 9, and the total resistance value due to the connecting materials and the electrical paths may correspond to the resistor R4 value of the PDN 400-4.

In this way, when each LDO regulator is included in a consumer such as the integrated circuit die 30 or the memory die 40, since a current sensor and a voltage sensor that sense the input current, output current, and input voltage of each LDO regulator are included in the corresponding consumer, the switching regulator controller may calculate the voltage drop caused by the PDN between the switching regulator and the LDO regulator.

Figure 11:
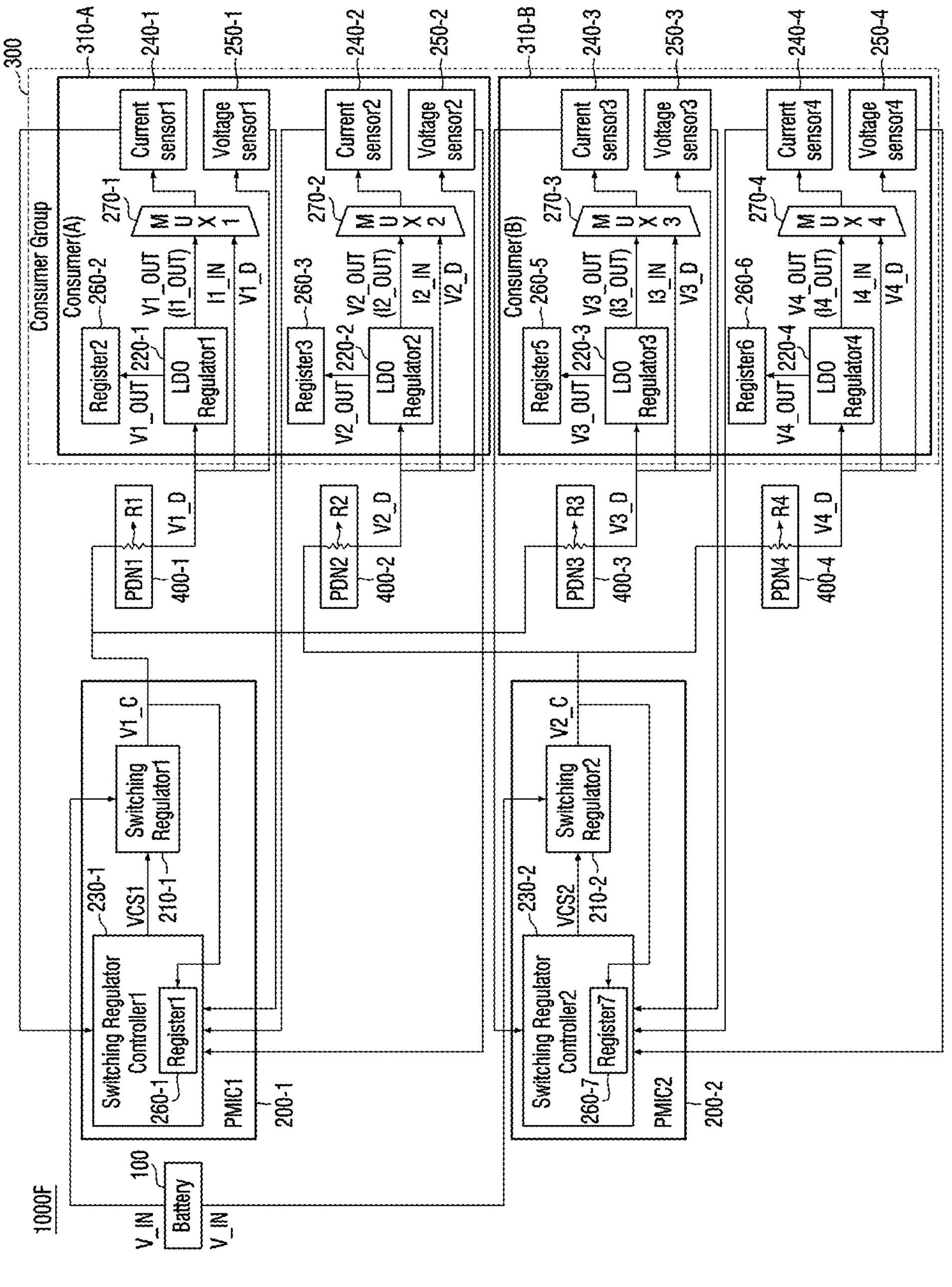
FIGS. 11 and 12 are a system diagram and a cross-sectional diagram, respectively, illustrating an electronic device including a power management device according to some implementations.
Figure 12:
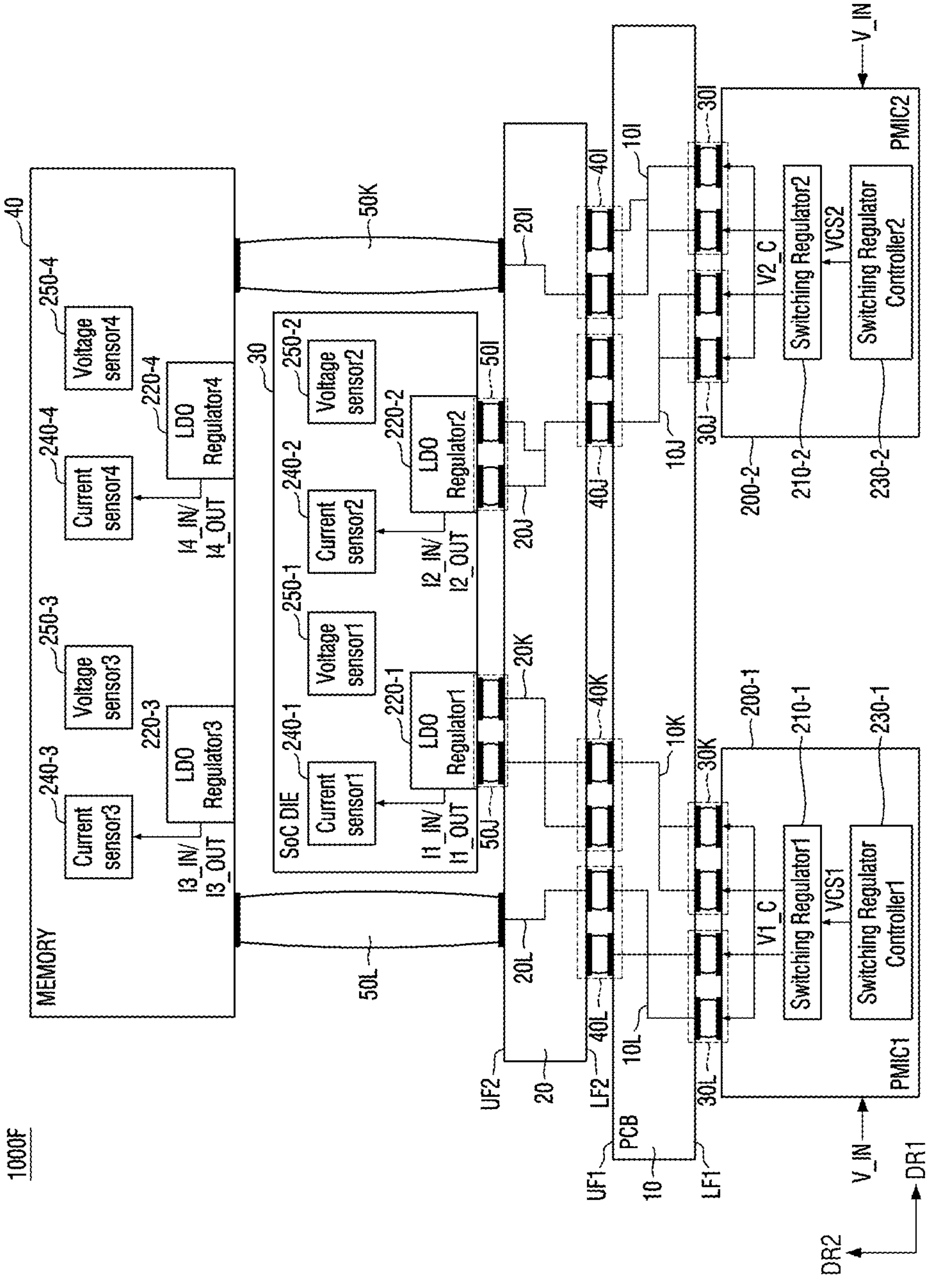

FIGS. 11 and 12 are diagrams illustrating an electronic device including a power management device according to some implementations. Hereinafter, repeated explanations of those of the previous examples will be omitted; the description provided with respect to elements of FIGS. 1 and 5-10 can equally apply to corresponding elements of FIGS. 11 and 12, except where noted otherwise or suggested otherwise from context.

First, referring to FIG. 11, in this example, the converted voltage V1_C that is output from the switching regulator 210-1 may be input to the LDO regulator 220-1 in the consumer 310-A via (or passed through) the PDN 400-1, and may be input to the LDO regulator 220-3 in the consumer 310-B via (or passed through) the PDN 400-3. Furthermore, the converted voltage V2_C that is output from the switching regulator 210-2 may be input to the LDO regulator 220-2 in the consumer 310-A via (or passed through) the PDN 400-2, and may be input to the LDO regulator 220-4 in the consumer 310-B via (or passed through) the PDN 400-4.

Referring to FIGS. 11 and 12 together, the converted voltage V1_C that is output from the switching regulator 210-1 may be input to the LDO regulator 220-1 in the integrated circuit die 30 through the connecting materials 30K, the electrical paths 10K, the connecting materials 40K, the electrical paths 20K, and the connecting materials 50J. In this way, the connecting materials 30K, 40K and 50J and the electrical paths 10K and 20K until the converted voltage V1_C output from the switching regulator 210-1 reaches the LDO regulator 220-1 in the integrated circuit die 30 may correspond to the PDN 400-1 of FIG. 9, and the total resistance value due to the connecting materials and the electrical paths may correspond to the resistor R1 value of the PDN 400-1.

Moreover, the converted voltage V1_C that is output from the switching regulator 210-1 may be input to the LDO regulator 220-3 in the memory die 40 through the connecting materials 30L, electrical paths 10L, connecting materials 40L, electrical paths 20L, and connecting materials 50L. In this way, the connecting materials 30L, 400 and 50L and the electrical paths 10L and 20L until the converted voltage V1_C output from the switching regulator 210-1 reaches the LDO regulator 220-3 in the memory die 40 may correspond to the PDN 400-3 of FIG. 11, and the total resistance value due to the connecting materials and the electrical paths may correspond to the resistor R3 value of the PDN 400-3.

The converted voltage V2_C that is output from the switching regulator 210-2 may be input to the LDO regulator 220-2 in the circuit die 30 through the connecting materials 30J, the electrical paths 10J, the connecting materials 40J, the electrical paths 20J, and the connecting materials 50I. In this way, the connecting materials 30J, 40J and 50I and the electrical paths 10J and 20J may correspond to the PDN 400-2 of FIG. 11, and the total resistance value due to the connecting materials and the electrical paths may correspond to the resistor R2 value of the PDN 400-2.

In addition, the converted voltage V2_C that is output from the switching regulator 210-2 may be input to the LDO regulator 220-4 in the memory die 40 through the connecting materials 30I, the electrical paths 10I, the connecting members 40I, the electrical paths 20I, and the connecting materials 50K. In this way, the connecting materials 30I, 40I and 50K and the electrical paths 10I and 20I until the converted voltage V2_C output from the switching regulator 210-2 reaches the LDO regulator 220-4 in the memory die 40 may corresponding to the PDN 400-4 of FIG. 11, and the total resistance value due to the connecting materials and the electrical paths may correspond to the resistor R4 value of the PDN 400-4.

In this way, the LDO regulators that receive the converted voltage from the same switching regulator in the same power management device may be disposed in different consumers from each other, when the LDO regulators are disposed in the consumer rather than the power management device.

Figure 13:
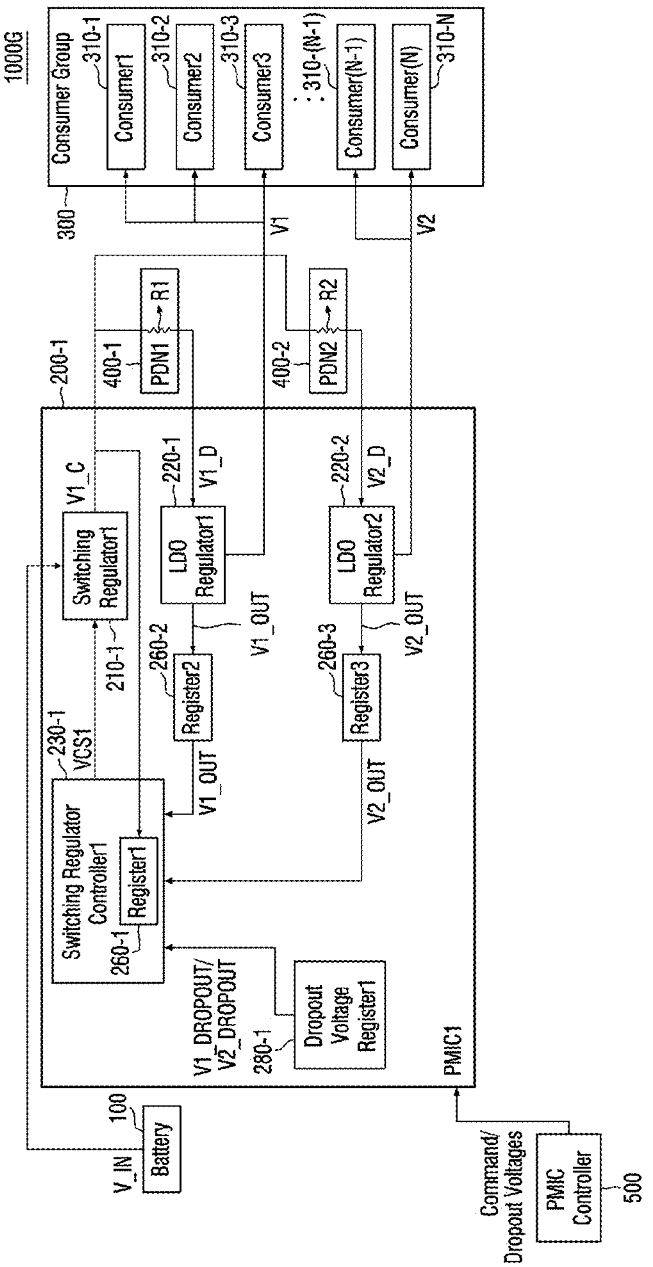
FIG. 13 is a diagram illustrating an electronic device including a power management device according to some implementations.

FIG. 13 is a diagram illustrating an electronic device including a power management device according to some implementations. FIG. 14 is a diagram for explaining dropout voltages stored in the dropout voltage register of FIG. 13. Hereinafter, repeated explanations of those of the previous examples will be omitted; the description provided with respect to elements of FIGS. 1 and 5-12 can equally apply to corresponding elements of FIG. 13, except where noted otherwise or suggested otherwise from context and the explanation will focus on the differences.

First, referring to FIG. 13, an electronic device 1000G may include a battery 100, a power management device 200-1, a power management device controller 500, and a consumer group 300. The power management device controller 500 may control an operation in which the power management device 200-1 receives an input voltage V_IN from the battery 100, and outputs the input voltage into a plurality of voltages V1 and V2 suitable for driving the consumers 310-1 to 310-N of the consumer group 300. Hereinafter, an example will be described in a case where the consumer group 300 is a SoC and the consumers 310-1 to 310-N are functional blocks included in the SoC. For example, the consumers 310-1 to 310-N may be an application processor (AP), a communication processor (CP), a global navigation satellite system (GNSS), or the like included in the SoC.

The power management device controller 500 and the power management device 200-1 may transmit and receive signals through an interface. For example, the power management device controller 500 may transmit commands and/or data to the power management device 200-1 through an I2C (Inter-Integrated Circuit) communication.

In some implementations, the power management device controller 500 may generate and transmit commands about operating scenarios of the SoC to the power management device 200-1. Further, the power management device controller 500 may transmit information about each of the dropout voltages V1_DROPOUT and V2_DROPOUT of the LDO regulators 220-1 and 220-2, according to the operating scenario of the SoC, to the power management device 200-1.

For example, referring to FIGS. 13 and 14 together, when the SoC includes functional blocks such as AP, CP, and GNSS, each of the dropout voltages V1_DROPOUT and V2_DROPOUT of the LDO regulators 220-1 and 220-2 may vary depending on the operating modes of the functional blocks. For example, when only the AP operates (Scenario 1), each of the dropout voltages V1_DROPOUT and V2_DROPOUT of the LDO regulator 220-1 and the LDO regulator 220-2 may be both 50 mV. Also, when CP is 1CC or GNSS operates (Scenario 2), the dropout voltage V1_DROPOUT of the LDO regulator 220-1 may be 50 mV, and the dropout voltage V2_DROPOUT of the LDO regulator 220-2 may be 40 mV.

Further, when CP exceeds 1 CC (Scenario 3), the dropout voltage V1_DROPOUT of the LDO regulator 220-1 may be 100 mV, and the dropout voltage V2_DROPOUT of the LDO regulator 220-2 may be 90 mV. Also, when the AP is in a sleep mode (Scenario 4), the dropout voltage V1_DROPOUT of the LDO regulator 220-1 is 30 mV, and the dropout voltage V2_DROPOUT of the LDO regulator 220-2 may be 30 mV. Also, when both AP and CP are in a sleep mode (Scenario 5), the dropout voltage V1_DROPOUT of the LDO regulator 220-1 is 30 mV, and the dropout voltage V2_DROPOUT of the LDO regulator 220-2 may be 30 mV.

In this way, the power management device controller 500 may store the dropout voltages of each LDO regulator in the power management device 200-1 in advance for each operating scenario of SoC. However, the magnitudes of the dropout voltages of the LDO regulators described with reference to FIG. 14 are examples, and the magnitudes of the dropout voltages of each LDO regulator corresponding to the operating scenario of SoC may vary in various implementations.

Referring again to FIG. 13, the power management device 200-1 may include a switching regulator controller 230-1, a switching regulator 210-1, LDO regulators 220-1 and 220-2, registers 260-1, 260-2, and 260-3, and a dropout voltage register 280-1.

The converted voltage V1_C generated by the switching regulator 210-1 may be stored in the register 260-1. Furthermore, the output voltage V1_OUT of the LDO regulator 220-1 may be stored in the register 260-2, and the output voltage V2_OUT of the LDO regulator 220-2 may be stored in the register 260-3. The dropout voltages V1_DROPOUT and V2_DROPOUT of each of the LDO regulators 220-1 and 220-2 for each operating scenario of SoC received by the power management device 200-1 from the power management device controller 500 may be stored in the dropout voltage register 280-1.

The switching regulator controller 230-1 may generate the voltage control signal VCS1, based on the output voltage V1_OUT of the LDO regulator 220-1 stored in the register 260-2, the output voltage V2_OUT of the LDO regulator 220-2 stored in the register 260-3, and the dropout voltages of each of the LDO regulators 220-1 and 220-2 stored in the dropout voltage register 280. Also, the value of the converted voltage V1_C generated by the switching regulator 210-1 may be dynamically controlled, by transmitting the voltage control signal VCS1 to the switching regulator 210-1.

For example, the switching regulator controller 230-1 may determine the value of the converted voltage V1_C generated by the switching regulator 210-1, based on the following formula 2.

$$V1\_C = MAX(V\_OUT + V\_DROPOUT + V\_PDN\_m) \quad \text{[Formula 2]}$$

The power management device 200-1 may receive each of the dropout voltages V1_DROPOUT/V2_DROPOUT of the LDO regulators 220-1 and 220-2 corresponding to the operating scenario of SoC of the command from the dropout voltage register 280-1, in response to reception of the command about the operating scenario of SoC from the power management device controller 500. Furthermore, the power management device 200-1 may receive the output voltages V1_OUT and V2_OUT of the LDO regulators 220-1 and 220-2 from the registers 260-2 and 260-3, respectively.

In the formula 2, the voltage margin V_PDN_m may be a voltage margin that is lowered by the PDN 400-1 and the PDN 400-2. In some implementations of the electronic device 1000G of FIG. 13, unlike some implementations of the electronic device of FIG. 1 or the like, since a current sensor and a voltage sensor are not included, the switching regulator controller 230-1 may know the voltage drop value caused by the PDNs 400-1 and 400-2. The switching regulator controller 230-1 may estimate the degree to which the converted voltage V1_C is lowered by each of the resistors R1 and R2 of the PDNs 400-1 and 400-2, and calculate formula 2.

The switching regulator controller 230-1 may calculate each of the sums of the output voltage V_OUT of the LDO regulator, the dropout voltage V_DROPOUT of the LDO regulator, and the voltage margin V_PDN_m caused by the PDN corresponding to the LDO regulator, on each of the LDO regulator 220-1 and 220-2. The switching regulator controller 230-1 may select the maximum value among the sum values, generate a voltage control signal VCS1 for controlling the switching regulator 210-1 so that the maximum value is equal to the value of the converted voltage V1_C, and may transmit the generated voltage control signal VCS1 to the switching regulator 210-1.

Figure 15:
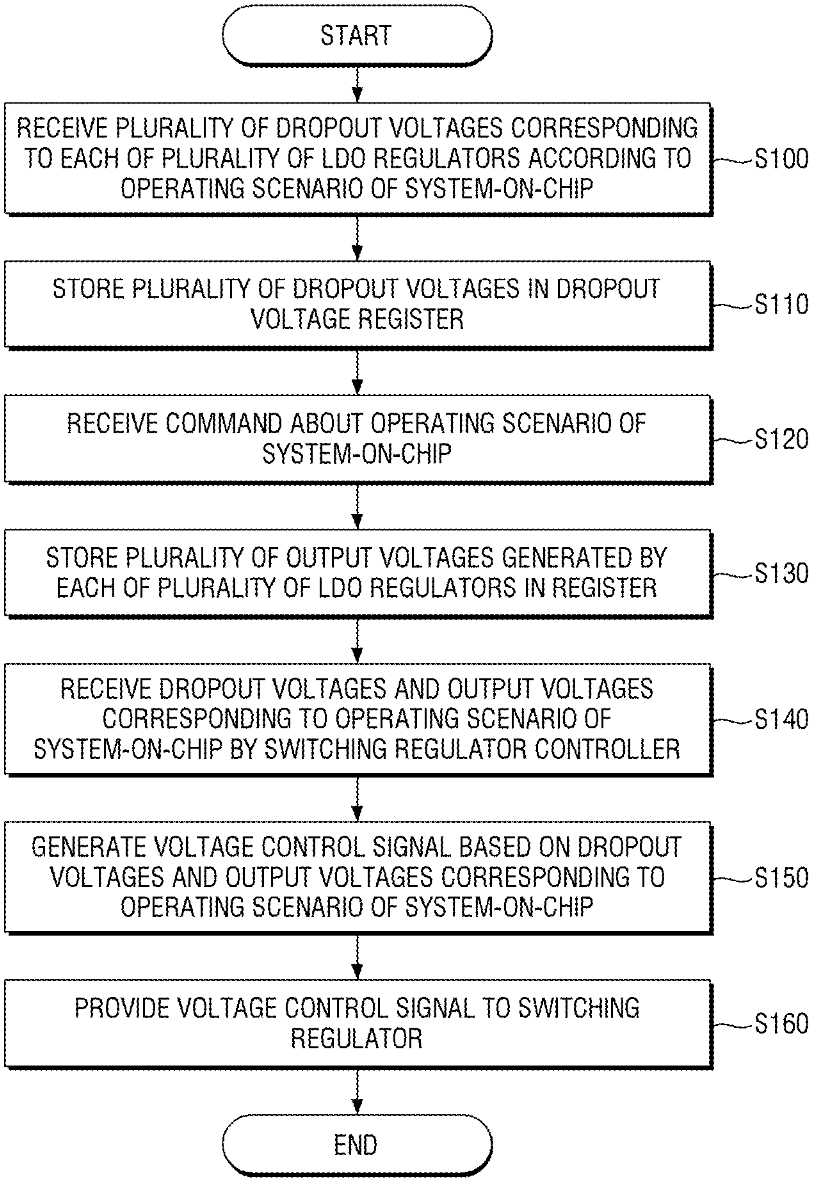
FIG. 15 is a flowchart illustrating a method for operating a power management device, according to some implementations.

FIG. 15 is a flowchart for explaining the method of operation of the power management device of FIG. 13. The method will be described below with reference to FIGS. 13 and 15.

The power management device 200-1 receives information about the dropout voltages V1_DROPOUT and V2_DROPOUT corresponding to each of the LDO regulators 220-1 and 220-2 according to the operating scenario of SoC from the power management device controller 500 (S100). The power management device 200-1 stores the received dropout voltages V1_DROPOUT and V2_DROPOUT in the dropout voltage register 280-1 (S110). The power management device 200-1 receives (for example, subsequent to S110) a command about the operating scenario of SoC from the power management device controller 500 (S120). The power management device 200-1 (e.g., subsequent to S120) stores the output voltages V1_OUT and V2_OUT each generated by the LDO regulators 220-1 and 220-2 in the registers 260-2 and 260-3 (S130). The output voltages V1_OUT and V2_OUT generated by the LDO regulators 220-1 and 220-2 may be modified to be suitable for the operating scenario of SoC by the power management device controller 500 to increase or maximize the power efficiency of the LDO regulators 220-1 and 220-2.

The switching regulator controller 230-1 (e.g., subsequent to S130) receives each of the dropout voltages V1_DROPOUT and V2_DROPOUT of each of the LDO regulators 220-1 and 220-2 corresponding to the operating scenario of SoC from the dropout voltage register 280-1 in response to reception of commands about the operating scenario of SoC from the power management device controller 500, and receives the output voltages V1_OUT and V2_OUT which are generated from the registers 260-2 and 260-3 by each of the LDO regulators 220-1 and 220-2 and changed to be suitable for the operating scenario of SoC (S140). The switching regulator controller 230-1 (e.g., subsequent to 140) generates a voltage control signal VCS1 based on the received dropout voltages V1_DROPOUT and V2_DROPOUT and the output voltages V1_OUT and V2_OUT (S150). The switching regulator controller 230-1 (e.g., subsequent to S150) provides the generated voltage control signal VCS1 to the switching regulator 210-1 (S160).

The magnitude of the converted voltage V1_C generated by the switching regulator 210-1 dynamically controlled by the voltage control signal VCS1 may be a value that is greater by the voltage margin V_PND_m than the maximum value among the sums of the output voltage and dropout voltage of each LDO regulator calculated by formula 2. For example, when the output voltage V1_OUT of the LDO regulator 220-1 is 1.8 V, the dropout voltage V1_DROPOUT of the LDO regulator 220-1 is 0.1 V, the output voltage V2_OUT of the LDO regulator 220-2 is 1.9 V, the dropout voltage V2_DROPOUT of the LDO regulator 220-2 is 0.2 V and the voltage margin V_PND_m is 0.3 V, the converted voltage V1_C may be 2.4 V (=1.9 V+0.2 V+0.3 V).

In this way, each dropout voltage of the LDO regulators may be set differently depending on the scenario of SoC, and dropout voltages set differently depending on the scenario may be stored in the dropout voltage register. Accordingly, the switching regulator controller 230-1 may automatically and dynamically control the converted voltage V1_C generated by the switching regulator 210-1 based on the dropout voltages set differently depending on the scenario.

Figure 16:
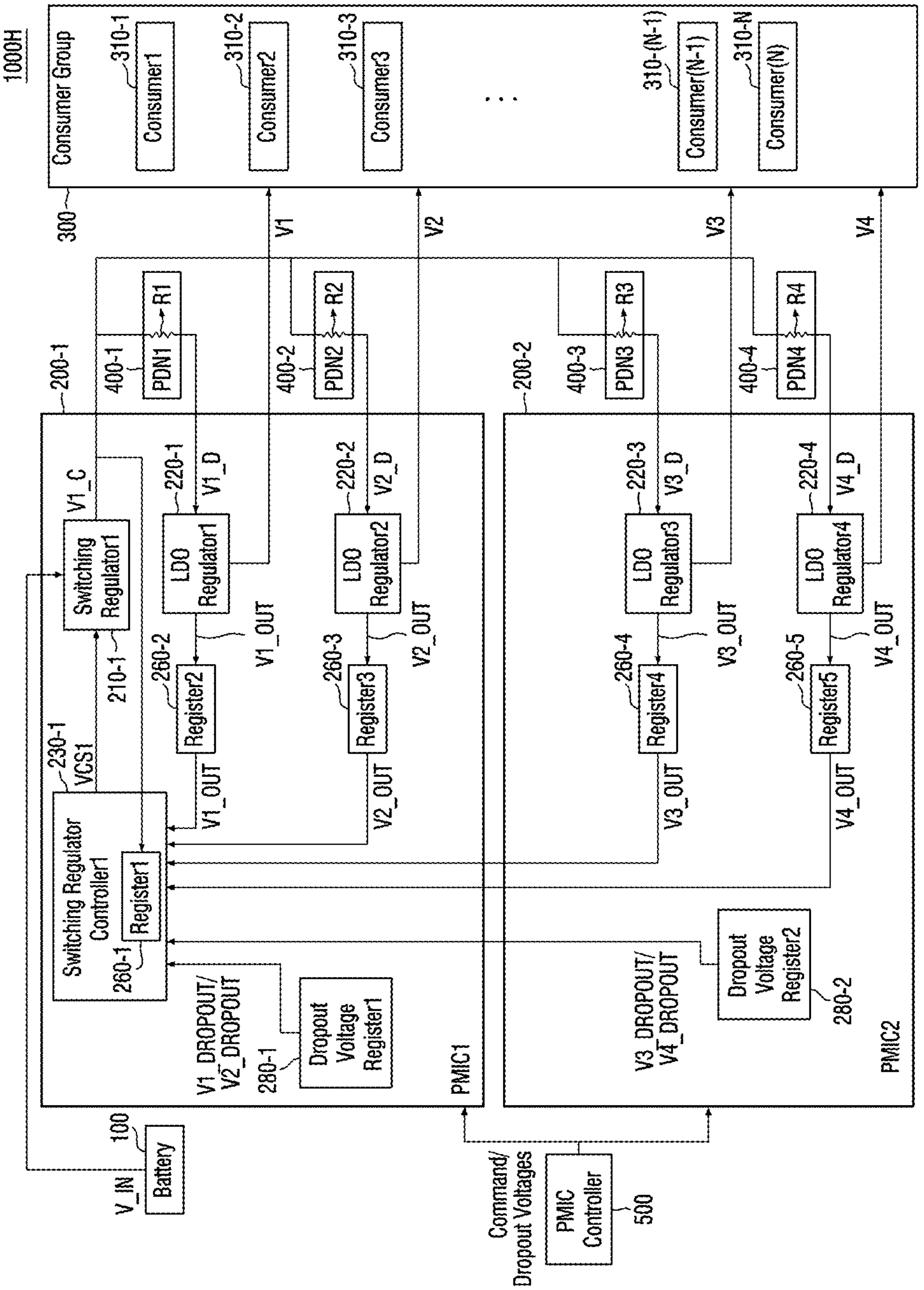
FIG. 16 is a diagram illustrating an electronic device including a power management device according to some implementations.

FIG. 16 is a diagram illustrating an electronic device including a power management device according to some implementations. Hereinafter, repeated explanations of those of the previous examples will be omitted; the description provided with respect to elements of FIGS. 1 and 5-13 can equally apply to corresponding elements of FIG. 16, except where noted otherwise or suggested otherwise from context.

Referring to FIG. 16, an electronic device 1000H may further include a power management device 200-2. The power management device 200-2 may include LDO regulators 220-3 and 220-4, resistors 260-4 and 260-5, and dropout voltage register 280-2. The LDO regulators 220-3 and 220-4 are grouped together with the LDO regulators 220-1 and 220-2, and may be connected to the switching regulator 210-1 in a multi-stage structure. The output voltage V3_OUT of the LDO regulator 220-3 may be stored in the register 260-4, and the output voltage V4_OUT of the LDO regulator 220-4 may be stored in the register 260-5.

The power management device controller 500 may transmit information about the respective dropout voltages V3_DROPOUT and V4_DROPOUT of the LDO regulators 220-3 and 220-4 according to the operating scenario of SoC to the power management device 200-2 through an interface. The dropout voltages V3_DROPOUT and V4_DROPOUT of each of the LDO regulators 220-3 and 220-4 according to the operating scenario of SoC received by the power management device 200-2 from the power management device controller 500 may be stored in the dropout voltage register 280-2.

The switching regulator controller 230-1 may generate the voltage control signal VCS1, based on the output voltage V1_OUT of the LDO regulator 220-1 stored in the register 260-2 of the power management device 200-1, the output voltage V2_OUT of the LDO regulator 220-2 stored in the register 260-3, and the dropout voltages of each of the LDO regulators 220-1 and 220-2 stored in the dropout voltage register 280-1, as well as the output voltage V3_OUT of the LDO regulator 220-3 stored in the register 260-4 of the power management device 200-2, the output voltage V4_OUT of the LDO regulator 220-4 stored in the register 260-5, and the dropout voltages V3_DROPOUT and V4_DROPOUT of each of the LDO regulators 220-3 and 220-4 stored in the register 280-2. Further, the switching regulator controller 230-1 may transmit the voltage control signal VCS1 to the switching regulator 210-1 to dynamically control the value of the converted voltage V1_C generated by the switching regulator 210-1.

For example, the switching regulator controller 230-1 may generate a voltage control signal VCS1 that dynamically controls the switching regulator 210-1 such that the value obtained by adding the voltage margin V_PDN_m to the sum of the output voltage and dropout voltage of the LDO regulator plus is equal to the converted voltage V1_C, based on the LDO regulator with the greatest sum of the output voltage and dropout voltage.

Figure 17:
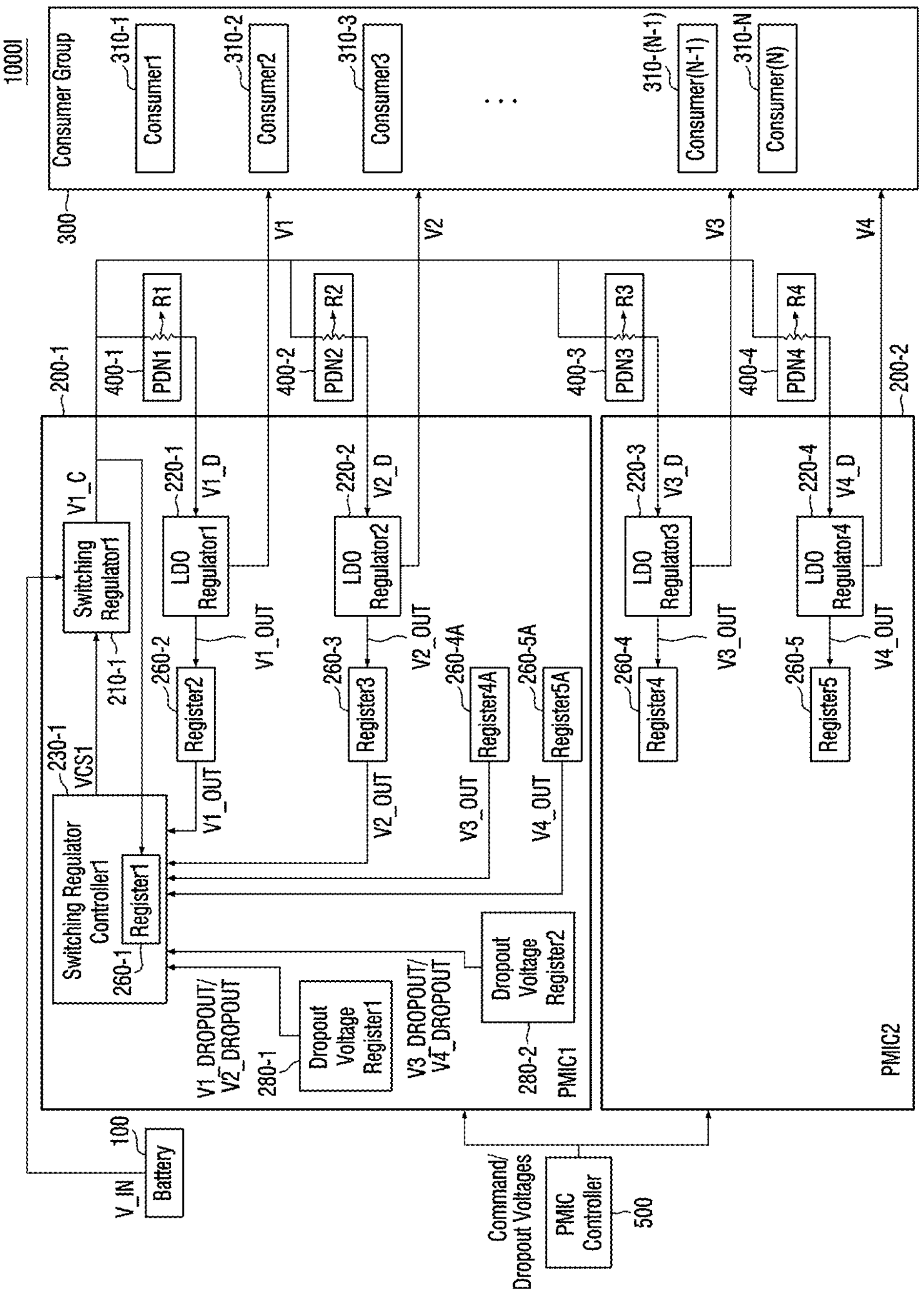
FIG. 17 is a diagram illustrating an electronic device including a power management device according to some implementations.

FIG. 17 is a diagram illustrating an electronic device including a power management device according to some implementations. Hereinafter, repeated explanations of those of the previous examples will be omitted; the description provided with respect to elements of FIGS. 1, 5-13, and 16 can equally apply to corresponding elements of FIG. 17, except where noted otherwise or suggested otherwise from context.

Referring to FIG. 17, a dropout voltage register 280-2 of an electronic device 1000I may be included in the power management device 200-1. Furthermore, the power management device 200-1 may further include a register 260-4A that stores the output voltage V3_OUT of the LDO regulator 220-3, and a register 260-5A that stores the output voltage V4_OUT of the LDO regulator 220-4.

In this way, the dropout voltage register 280-2, which stores each of the dropout voltages V3_DROPOUT and V4_DROPOUT of the LDO regulators 220-3 and 220-4 included in the power management device 200-2, may be included in the power management device 200-1 that includes the switching regulator 210-1. Furthermore, the output voltages V3_OUT and V4_OUT of the LDO regulators 220-3 and 220-4 which receive the converted voltage V1_C from the switching regulator 210-1 and are included in the power management device 200-2 that does not include the switching regulator 210-1, are each stored in the existing registers 260-4 and 260-5, and may also be simultaneously stored in the registers 260-4A and 260-5A included in the power management device 200-1 including the switching regulator 210-1.

Therefore, when the electronic device 1000I includes a plurality of power management devices 200-1 and 200-2, there may be no need for adding an interface to receive the output voltage and dropout voltage information of the LDO regulators between the power management devices 200-1 and 200-2.

Figure 18:
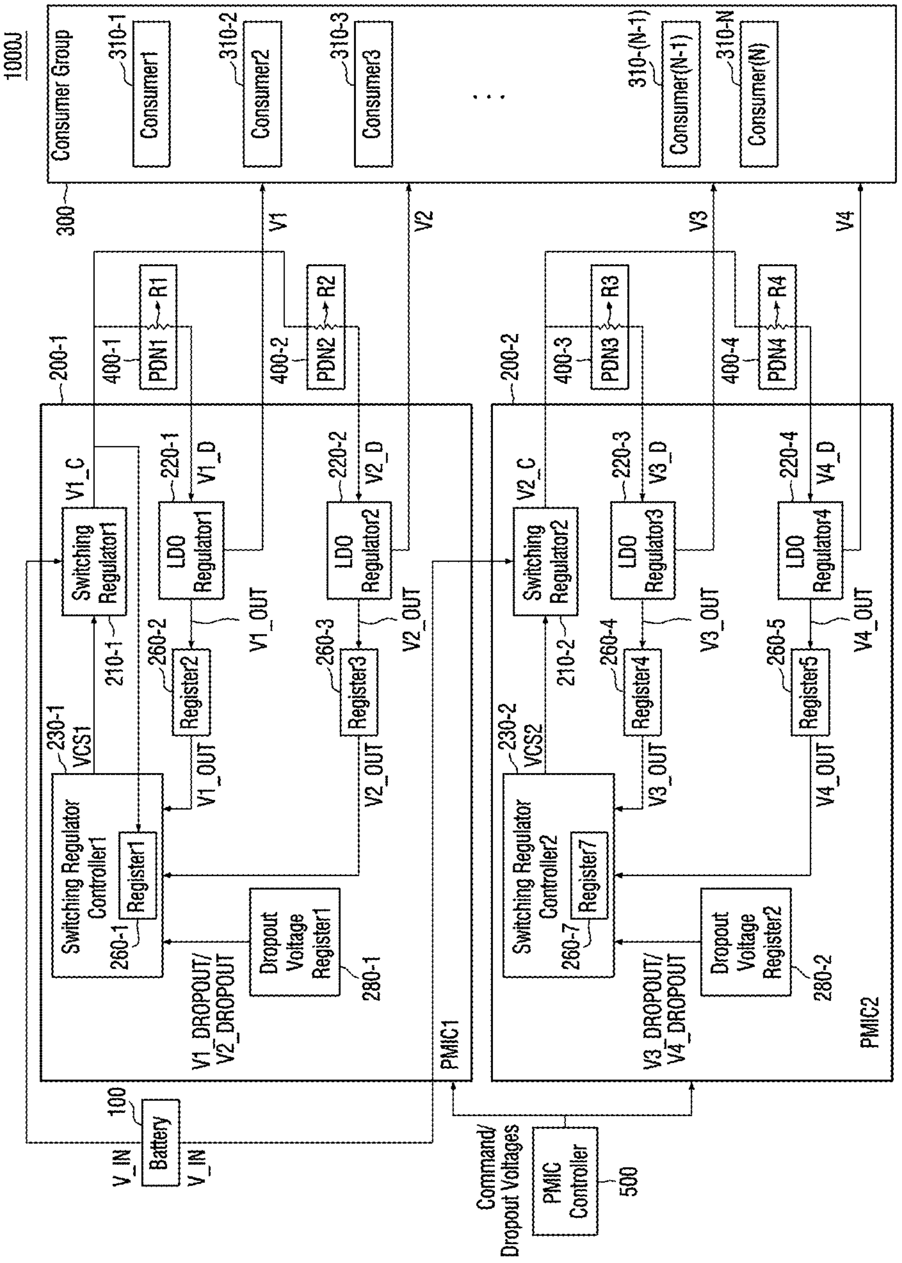
FIG. 18 is a diagram illustrating an electronic device including a power management devices according to some implementations.

FIG. 18 is a diagram illustrating an electronic device including a power management device according to some implementations. Hereinafter, repeated explanations of those of the previous examples will be omitted; the description provided with respect to elements of FIGS. 1, 5-13, and 16-17 can equally apply to corresponding elements of FIG. 18, except where noted otherwise or suggested otherwise from context.

Referring to FIG. 18, an electronic device 1000J may include a plurality of power management devices 200-1 and 200-2 which each receive an input voltage V_IN from the battery 100, and each of the plurality of power management devices 200-1 and 200-2 may include switching regulators 210-1 and 210-2 and switching regulator controllers 230-1 and 230-2. Although FIG. 18 shows that the power management devices 200-1 and 200-2 are controlled by the same power management device controller 500, the present disclosure is not limited thereto. In some implementations, each of the power management devices 200-1 and 200-2 may be controlled by power management device controllers different from each other.

The power management device 200-2 may have a structure similar to that of the power management device 200-1. For example, the switching regulator 210-2 may receive the input voltage V_IN from the battery 100 to generate the converted voltage V2_C. The magnitude of the converted voltage V2_C may be different from the magnitude of the converted voltage V1_C.

The converted voltage V2_C that is output from the switching regulator 210-2 is reduced in voltage via (or passed through) the PDN 400-3, converted into a drop voltage V3_D, and may be input to the LDO regulator 220-3. The LDO regulator 220-3 may generate an output voltage V3_OUT from the drop voltage V3_D, and the generated output voltage V3_OUT may be stored in the register 260-4, and then transmitted to the switching regulator controller 230-2.

Furthermore, the converted voltage V2_C that is output from the switching regulator 210-2 is reduced in voltage via (or passed through) the PDN 400-4, converted into a drop voltage V4_D, and may be input to the LDO regulator 220-4. The LDO regulator 220-4 may generate the output voltage V4_OUT from the drop voltage V4_D, and the generated output voltage V4_OUT may be stored in the register 260-5 and then transmitted to the switching regulator controller 230-2. The output voltages V3_OUT and V4_OUT may be changed by the power management device controller 500 to be suitable for the operating scenario of the SoC to maximize the power efficiency of the LDO regulators 220-3 and 220-4.

The power management device controller 500 may transmit information about each of the dropout voltages V3_DROPOUT and V4_DROPOUT of the LDO regulators 220-3 and 220-4 to the power management device 200-2 through the interface, and the dropout voltages V3_DROPOUT and V4_DROPOUT may be stored in the dropout register 280-2 in the power management device 200-2.

The switching regulator controller 230-2 may generate the voltage control signal VCS2, based on the output voltage V3_OUT of the LDO regulator 220-3 stored in the register 260-4, the output voltage V3_OUT of the LDO regulator 220-4 stored in the register 260-5, and the dropout voltages V3_DROPOUT and V4_DROPOUT of the respective LDO regulators 220-3 and 220-4 stored in the dropout voltage register 280-2.

For example, the switching regulator controller 230-2 may calculate the sum value of the output voltage and dropout voltage for each of the LDO regulators 220-3 and 220-4 through formula 2 described with reference to FIG. 13, and may control the switching regulator 210-2 so that the sum value of the maximum value among the calculated sum values and the voltage margin V_PDN_m value is equal to the converted voltage V2_C value.

In this way, the switching regulator controller 230-2 may transmit the voltage control signal VCS2 for controlling the switching regulator 230-2 to the switching regulator 210-2, and may dynamically control the value of the converted voltage V2_C generated by the switching regulator 210-2.

In this way, when one electronic device includes the plurality of power management devices and each power management device includes the switching regulator, each power management device may include the switching regulator controller that corresponds one-to-one to the front end of the switching regulator. Further, the switching regulator controller may perform an operation for controlling the corresponding switching regulator independently of other switching regulator controllers included in other power management devices.

Figure 19:
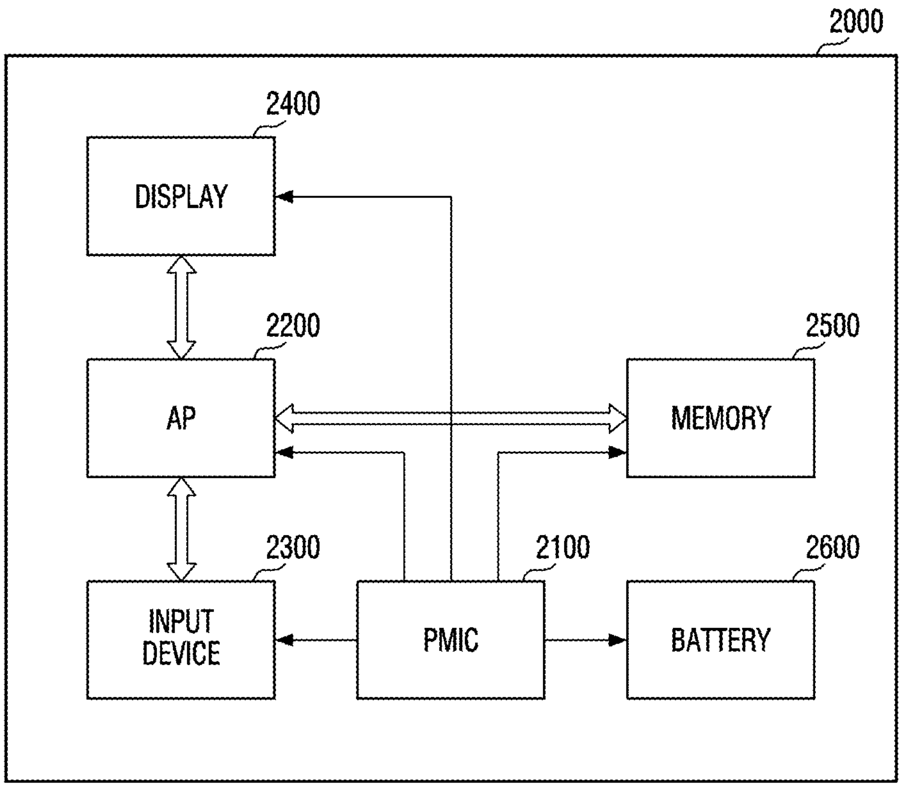
FIG. 19 is a diagram illustrating an electronic device according to some implementations.

FIG. 19 is a diagram illustrating an electronic device according to some implementations. Referring to FIG. 19, an electronic device 2000 may include a power management device 2100, an AP 2200, an input device 2300, a display 2400, a memory 2500, and a battery 2600. The electronic device 2000 may be any of the electronic devices described with reference to FIGS. 1 to 18. For example, the electronic device 2000 may be a smartphone, a personal computer (PC), a tablet PC, a netbook, an e-reader, a personal digital assistant (PDA), a portable multimedia player (PMP), a MP3 player, and the like. Furthermore, the electronic device 2000 may be a wearable device such as an electronic bracelet or an electronic necklace.

The power management device 2100 may be any one of the electronic devices or power management devices described with reference to FIGS. 1 to 18. The power management device 2100 is supplied with power from the battery 2600, and may manage power of the AP 2200, the input device 2300, the display 2400 or the memory 2500. The AP 2200, the input device 2300, the display 2400, and the memory 2500 may be any one of the consumers 310-1 to 310-N described with reference to FIGS. 1 to 18. The AP 2200 controls the overall operation of the electronic device 2000. For example, the AP 2200 may display data stored in the memory 2500 through the display 2400 in accordance with an input signal generated by the input device 2300. For example, the input device 2300 may be implemented as a pointing device such as a touch pad or a computer mouse, a keypad, or a keyboard.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

Further, although various examples have been described with reference to the accompanying drawings, the present disclosure is not limited to the above examples and may be implemented in various different forms. Those of ordinary skill in the technical field to which the present disclosure belongs will be able to understand that the present disclosure may be implemented in other specific forms without changing the technical idea or essential characteristics of the present disclosure. Therefore, it should be understood that the examples described above are not restrictive but illustrative in all respects.

What is claimed is:

1. An electronic device comprising:

a first power management device configured to receive an input voltage and output a plurality of first voltages based on the input voltage; and at least one consumer configured to receive the plurality of first voltages from the first power management device and operate based on the plurality of first voltages, wherein the first power management device includes:

a switching regulator configured to generate a converted voltage based on the input voltage, a first low drop-out (LDO) regulator configured to generate a first output voltage based on a first drop voltage, the first drop voltage generated based on the converted voltage passing through a first power distribution network (PDN), a second LDO regulator which is configured to generate a second output voltage based on a second drop voltage, the second drop voltage generated based on the converted voltage passing through a second PDN, and a switching regulator controller configured to determine a first dropout voltage of the first LDO regulator based on a first output current of the first LDO regulator, determine a second dropout voltage of the second LDO regulator based on a second output current of the second LDO regulator, determine a first voltage drop caused by the first PDN based on a first input current and a first input voltage of the first LDO regulator, determine a second voltage drop caused by the second PDN based on a second input current and a second input voltage of the second LDO regulator, and dynamically control the converted voltage based on the first dropout voltage, the second dropout voltage, the first voltage drop, and the second voltage drop.

2. The electronic device of claim 1, further comprising:

a second power management device configured to receive the input voltage and output a plurality of second voltages based on the input voltage, wherein the second power management device includes a third LDO regulator configured to generate a third output voltage based on a third drop voltage, the third drop voltage generated based on the converted voltage passing through a third PDN, and wherein the at least one consumer is configured to operate based on the plurality of first voltages and the plurality of second voltages.

3. The electronic device of claim 2, wherein the switching regulator controller is configured to:

determine a third dropout voltage of the third LDO regulator based on a third output current of the third LDO regulator; and determine a third voltage drop caused by the third PDN based on a third input current and a third input voltage of the third LDO regulator.

4. The electronic device of claim 3, wherein the switching regulator controller is configured to dynamically control the converted voltage based further on the third dropout voltage and the third voltage drop.

5. The electronic device of claim 1, further comprising a first register configured to store the converted voltage, a second register configured to store the first output voltage, and a third register configured to store the second output voltage.

6. The electronic device of claim 1, wherein, based on a first sum of the first output voltage, the first dropout voltage, and the first voltage drop being greater than a second sum of the second output voltage, the second dropout voltage, and the second voltage drop, the switching regulator controller is configured to:

generate a voltage control signal that controls the switching regulator such that the converted voltage matches the first sum of the first output voltage, the first dropout voltage, and the first voltage drop; and transmit the generated voltage control signal to the switching regulator.

7. The electronic device of claim 1, further comprising:

a first voltage sensor configured to sense the first input voltage of the first LDO regulator; and a second voltage sensor configured to sense the second input voltage of the second LDO regulator, wherein the first voltage sensor is configured to transmit the sensed first input voltage value to the switching regulator controller, and wherein the second voltage sensor is configured to transmit the sensed second input voltage value to the switching regulator controller.

8. The electronic device of claim 1, further comprising:

a first current sensor configured to sense a first current from among the first input current of the first LDO regulator and the first output current of the first LDO regulator, and transmit a value of the sensed first current to the switching regulator controller; and a second current sensor configured to sense a second current from among the second input current of the second LDO regulator and the second output current of the second LDO regulator, and transmit the value of the sensed second current to the switching regulator controller.

9. An electronic device comprising:

a first power management device configured to receive an input voltage and output a plurality of first voltages for driving a system-on-chip based on the input voltage; and a power management device controller configured to control operation of the first power management device, generate a command indicating a current operating scenario of the system-on-chip, and transmit the command to the first power management device, wherein the first power management device includes:

a switching regulator configured to generate a converted voltage based on the input voltage;

a plurality of low drop-out (LDO) regulators configured to generate a corresponding plurality of output voltages based on the converted voltage;

first registers configured to store a plurality of output voltages generated by the plurality of LDO regulators;

a first dropout voltage register configured to store a plurality of dropout voltages corresponding to each of the plurality of LDO regulators, the plurality of dropout voltages corresponding to operating scenarios of the system-on-chip; and a switching regulator controller configured to:

receive the plurality of output voltages from the first registers, receive dropout voltages corresponding to the current operating scenario of the system-on-chip, from among the plurality of dropout voltages, from the first dropout voltage register, and dynamically control the converted voltage based on the plurality of received output voltages and the dropout voltages corresponding to the current operating scenario, in response to reception of the command from the power management device controller.

10. The electronic device of claim 9, wherein the switching regulator controller is configured to:

generate a voltage control signal that controls the converted voltage based on an output voltage corresponding to a first LDO regulator of the plurality of LDO regulators and based on a dropout voltage corresponding to the first LDO regulator, based on the first LDO regulator having a greatest sum of output voltage and dropout voltage among the plurality of the LDO regulators; and transmit the generated voltage control signal to the switching regulator.

11. The electronic device of claim 9, wherein the power management device controller is configured to transmit the plurality of dropout voltages corresponding to each of the plurality of the LDO regulators to the first power management device.

12. The electronic device of claim 9, wherein the plurality of LDO regulators include a first LDO regulator which is configured to generate a first output voltage from the converted voltage, and a second LDO regulator which is configured to generate a second output voltage from the converted voltage, wherein the system-on-chip includes a first functional block and a second functional block, wherein the first functional block is configured to operate based on the first output voltage, and wherein the second functional block is configured to operate based on the second output voltage.

13. The electronic device of claim 12, wherein, based on a first sum of the first output voltage and a first dropout voltage corresponding to the first LDO regulator being greater than a sum of the second output voltage and a second dropout voltage corresponding to the second LDO regulator, the switching regulator controller is configured to:

control the switching regulator to generate the converted voltage, based on a difference between the voltage output from the switching regulator and the voltage input to the first LDO regulator, and the voltage input to the first LDO regulator.

14. The electronic device of claim 13, wherein a power distribution network (PDN) having a resistance is electrically connected between the switching regulator and the first LDO regulator, and wherein the switching regulator is configured to control the switching regulator such the converted voltage matches a sum of the first output voltage, the first dropout voltage, and a voltage drop corresponding to the resistance of the PDN.

15. The electronic device of claim 12, further comprising:

a second power management device configured to output a plurality of second voltages for driving the system-on-chip, the plurality of second voltages output based on the input voltage, wherein the power management device controller is configured to control operation of the second power management device.

16. The electronic device of claim 15, wherein the second power management device includes:

a third LDO regulator configured to generate a third output voltage based on the converted voltage, and a third register configured to store the third output voltage, and wherein the switching regulator controller is configured to:

receive the third output voltage from the third register, receive a third dropout voltage of the third LDO regulator, the third dropout voltage corresponding to the current operating scenario of the system-on-chip, and dynamically control the converted voltage based further on the third output voltage and the third dropout voltage.

17. The electronic device of claim 16, wherein the second power management device further includes a second dropout voltage register configured to store the third dropout voltage, and wherein the switching regulator controller is configured to receive the third dropout voltage from the second dropout voltage register.

18. The electronic device of claim 16, wherein the first power management device further includes a second dropout voltage register configured to store the third dropout voltage, and wherein the switching regulator controller is configured to receive the third dropout voltage from the second dropout voltage register.

19. The electronic device of claim 16, wherein the first power management device further includes a fourth register configured to store the third output voltage.

20. An operation method of a power management device, wherein the power management device includes a switching regulator configured to generate a converted voltage based on an input voltage, and a switching regulator controller configured to dynamically control the converted voltage, the operating method comprising:

receiving a plurality of dropout voltages corresponding to each of a plurality of low drop-out (LDO) regulators, the plurality of dropout voltages corresponding to operating scenarios of a system-on-chip from a power management device controller;

storing the plurality of dropout voltages in a dropout voltage register;

receiving a command indicating a current operating scenario of the system-on-chip from the power management device controller;

storing a plurality of output voltages generated by the plurality of the LDO regulators in first registers;

in response to the command, obtaining, at the switching regulator controller, dropout voltages corresponding to the current operating scenario from among the plurality of dropout voltages stored in the dropout voltage register, and obtaining the plurality of output voltages from the first registers;

generating, by the switching regulator controller, a voltage control signal for controlling the switching regulator, based on the obtained dropout voltages and the obtained plurality of output voltages; and providing the generated voltage control signal to the switching regulator.

* * * * *